United States Patent
Lim et al.

(10) Patent No.: US 9,379,922 B2
(45) Date of Patent: Jun. 28, 2016

(54) METHOD AND APPARATUS FOR SUPPORTING MULTIPLE-ACCESS SIGNAL IN MOBILE COMMUNICATION SYSTEM

(71) Applicants: Samsung Electronics Co., Ltd, Gyeonggi-do (KR); Research & Business Foundation Sungkyunkwan University, Gyeonggi-do (KR)

(72) Inventors: Chi-Woo Lim, Gyeonggi-do (KR); Sang-Hyo Kim, Seoul (KR); Min Jang, Seoul (KR); Jin-Hwan Kang, Seoul (KR); Kyung-Kyu Kim, Seoul (KR); Dae-Gyun Kim, Gyeonggi-do (KR); Hyun-Seok Ryu, Yongin-si (KR); Seung-Hoon Park, Seoul (KR); Seung-Sik Shin, Gyeonggi-do (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/076,051

(22) Filed: Nov. 8, 2013

(65) Prior Publication Data
US 2014/0133593 A1      May 15, 2014

(30) Foreign Application Priority Data
Nov. 9, 2012  (KR) .................. 10-2012-0126928

(51) Int. Cl.
*H04L 25/03*  (2006.01)
*H04L 5/00*  (2006.01)

(52) U.S. Cl.
CPC ...... *H04L 25/03203* (2013.01); *H04L 25/0328* (2013.01); *H04L 5/0007* (2013.01)

(58) Field of Classification Search
CPC ..................... H04L 25/03203; H04L 25/0328; H04L 5/007
USPC ......... 375/265, 148, 260, 262, 219, 295, 136, 375/316, 341, 343, 346; 370/203, 204, 208, 370/209
See application file for complete search history.

(56) References Cited

U.S. PATENT DOCUMENTS 7,961,708 B2    6/2011  Li et al.
8,498,326 B1 *  7/2013  Simanapalli et al. ......... 375/219
(Continued)

FOREIGN PATENT DOCUMENTS

JP    2012521102 A    9/2012

OTHER PUBLICATIONS

International Search Report dated Feb. 12, 2014 in connection with International Patent Application No. PCT/KR2013/010191; 3 pp.
(Continued)

*Primary Examiner* — Dhaval Patel

(57) ABSTRACT

In order to generate multiple-access signals, each transmitter transmits information by using all or a part of channel resources. The signal of each transmitter is mapped to an OFDM time-frequency resource space as a trellis modulation path. A mobile communication system maps trellis modulation paths of a plurality of transmitters to the same resource space. In order to effectively detect and distinguish signals of a plurality of transmitters transmitted through the same channel resource space, a receiver uses a message passing method between symbols and a path connection method. The receiver uses a state space expansion method, a backward pre-decoding method, and a successive interference cancellation method to more efficiently reconstruct a discovery signal.

36 Claims, 24 Drawing Sheets

(56) References Cited

U.S. PATENT DOCUMENTS

| | | | |
|---|---|---|---|
| 8,630,362 B1* | 1/2014 | von der Embse | 375/262 |
| 2009/0213967 A1* | 8/2009 | Yeh | 375/341 |
| 2010/0061334 A1* | 3/2010 | Gault et al. | 370/330 |
| 2011/0075649 A1 | 3/2011 | Li | |
| 2011/0170637 A1 | 7/2011 | Lorenzelli | |
| 2011/0243213 A1 | 10/2011 | Kim et al. | |
| 2012/0002746 A1 | 1/2012 | Pham | |
| 2012/0093249 A1 | 4/2012 | Sun et al. | |

OTHER PUBLICATIONS

Written Opinion dated Feb. 12, 2014 in connection with International Patent Application No. PCT/KR2013/010191; 5 pp.

Francois Baccelli, et al., "On the Design of Device-to-Device Autonomous Discovery", IEEE, Jan. 3, 2012, 9 pages.

* cited by examiner

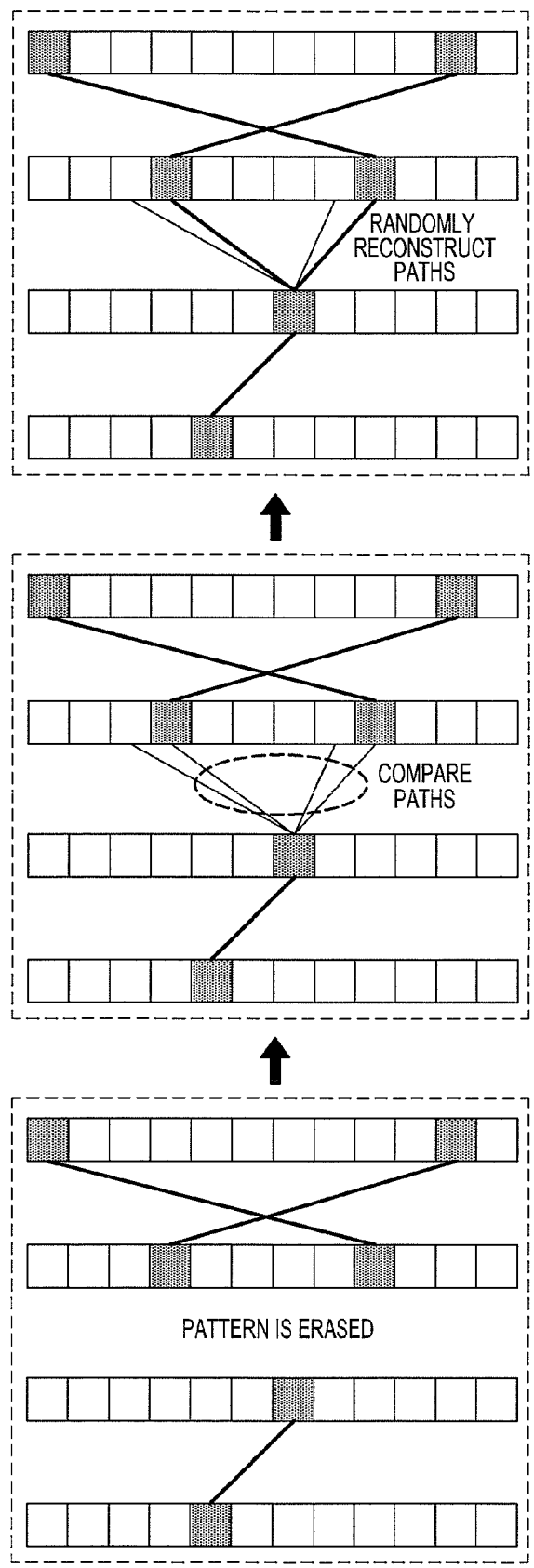

BACKWARDLY COPY AND THEN COMBINE

METHOD AND APPARATUS FOR SUPPORTING MULTIPLE-ACCESS SIGNAL IN MOBILE COMMUNICATION SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2012-0126928, which was filed in the Korean Intellectual Property Office on Nov. 9, 2012 the entire content of which is hereby incorporated by reference.

TECHNICAL FIELD

The present disclosure relates to a mobile communication system, and more particularly to a method and an apparatus for generating/reconstructing a multi-access signal.

BACKGROUND

Mobile communication systems are extensively constructed to provide various types of communication. For example, a voice and/or data may be provided through the mobile communication systems. The typical mobile communication system or network may provide access to one or more shared resources to a plurality of users.

In general, a multiple-access in the mobile communication system refers to a method in which a plurality of transmitters transmit signals within the same area having a limited frequency band by using the same transmission medium and share transmission capacity of the transmission medium through the multiple-access. The multiple-access technology is largely classified into two methods.

A first method corresponds to a contention-based multiple-access. A plurality of transmitters transmit multiple-access signals by using the same channel. At this time, when two or more signals are simultaneously transmitted, the signals may collide with each other. In order to solve the problem due to the collision between signals, a collision detection and recovery method, a collision avoidance method, or the like is used.

A second method corresponds to a channel resource division method. The transmitters exclusively receive a part of given channel resources and transmit multiple-access signals. At this time, the channel resource may be time, frequencies, orthogonal codes, or the like. The channel resource division method corresponds to a method in which a plurality of transmitters share all given resources, and an Orthogonal Frequency Division Multiple-Access (OFDMA) having an excellent frequency efficiency is mainly used recently.

SUMMARY

To address the above-discussed deficiencies, it is a primary object to provide an apparatus and a method for simply performing a process of generating and reconstructing a multiple-access signal.

The present disclosure provides an apparatus and a method in which, even though a plurality of transmitters transmit signals by using the same channel resource space, a receiver effectively detects the signals and accurately distinguishes between the signals of respective transmitters.

The present disclosure provides an apparatus and a method capable of acquiring a high power gain through the generation of a single-tone signal.

In accordance with an aspect of the present disclosure, a method of transmitting a multiple-access signal in a mobile communication system is provided. The method includes: selecting a transmission resource based on a trellis map; and transmitting data using the selected transmission resource to a receiver, wherein the trellis map includes information related to a position changing of at least one of tones.

In accordance with another aspect of the present disclosure, an apparatus for transmitting a multiple-access signal in a mobile communication system is provided. The apparatus includes: a controller that selects a transmission resource based on a trellis map; and a transmitter that transmits data using the selected transmission resource to a receiver, wherein the trellis map includes information related to a position changing of at least one of tones.

In accordance with another aspect of the present disclosure, a method of receiving a multiple-access signal in a mobile communication system is provided. The method includes: demodulating a multiple-access signal transmitted from a transmitter; and reconstructing the multiple-access signal based on a trellis map, wherein the reconstructed signal is selected a transmission resource by the transmitter based on the trellis map, and is a transmitted data using the selected transmission resource; and wherein the trellis map includes information related to a position changing of at least one of tones.

In accordance with another aspect of the present disclosure, an apparatus for receiving a multiple-access signal in a mobile communication system is provided. The apparatus includes: a demodulator that demodulates a multiple-access signal transmitted from a transmitter: and a controller that reconstructs the multiple-access signal based on a trellis map, wherein the reconstructed signal is selected a transmission resource by the transmitter based on the trellis map, and is a transmitted data using the selected transmission resource; and wherein the trellis map includes information related to a position changing of at least one of tones.

According to the present disclosure, it is possible to simply perform a process of generating and reconstructing a signal.

According to the present disclosure, even though a plurality of transmitters transmit signals by using the same channel resource space, a receiver can effectively detect the signals and distinguish between the signals.

According to the present disclosure, an amount of parity can be decreased by not using a channel code since overlapping is allowed.

According to the present disclosure, a high power gain is acquired through the generation of the single-tone signal, and thus discovery coverage and discovery capacity can be increased.

According to the present disclosure, a separate pilot is not used since a trellis-modulated tone can be used for predicting a channel, and accordingly, overheads can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 18A to 18C illustrate a reconstruction method when a pattern is lost in the reconstruction according to the first sub embodiment of the second embodiment of the present disclosure;

DETAILED DESCRIPTION

Figure 1:
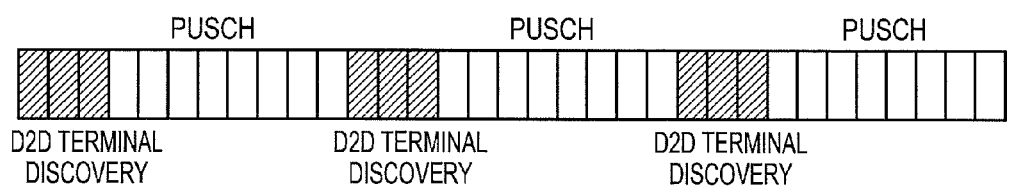
FIG. 1 illustrates an uplink LTE-D2D timing structure which can be applied to the LTE standard in a general mobile communication system.

FIGS. 1 through 34, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication technologies. Hereinafter, operation principles of exemplary embodiments of the present disclosure will be described in detail with reference to accompanying drawings. In the following description of the present disclosure, a detailed description of known configurations or functions incorporated herein will be omitted when it is determined that the detailed description may make the subject matter of the present disclosure unclear. Terms described later are defined in consideration of the functions of the present disclosure, but may vary according to the intention or convention of a user or operator. Therefore, the definitions should be made based on contents throughout the specifications.

Further, various embodiments are described in associated with a wireless terminal (hereinafter referred to as a "terminal"). In addition, the terminal can be called a system, a subscriber unit, a subscriber station, a mobile station, a mobile remote station, an access point, a remote terminal, an access terminal, a user terminal, a user agent, a user device, or a User Equipment (UE). The terminal can be a cellular phone, a cordless phone, a Session Initiation Protocol (SIP) phone, a Wireless Local Loop (WLL) station, a Personal Digital Assistant (PDA), a portable device having a wireless access capability, a computing device, or a processing device connected to a wireless modem.

Various embodiments or features provided hereinafter can be implemented by a method, an apparatus, or article of manufacture using standard programming and/or an engineering technique. The term "article of manufacture" used herein includes a computer program, a carrier, or a medium which can be accessed by an arbitrary computer-readable device. For example, the computer-readable medium includes a magnetic storage device (for example, a hard disk, a floppy disk, a magnetic strip or the like), an optical disk (for example, a Compact Disk (CD), a Digital Versatile Disk (DVD) or the like), a smart card, and a flash memory device (for example, an Electrically Erasable and Programmable Read Only Memory (EEPROM), a card, a stick, a key drive or the like), but the present disclosure is not limited thereto. Further, various storage media provided herein include one or more devices for storing information and/or a machine-readable medium. The term "machine-readable medium" includes a wireless channel which can store, possess, and/or transmit command(s) and/or data and other various media, but the present disclosure is not limited thereto.

A multiple-access environment generally indicates a case where a plurality of terminals transmit signals to one relay and base stations in a mobile communication system. However, the multiple-access environment includes various types of new communication environments, for example, a Device-to Device (D2D) environment or a Machine-to-Machine (M2M) environment. Hereinafter the D2D environment will be described as an example.

FIG. 1 illustrates an uplink Long Term Evolution (LTE)-D2D timing structure which can be applied to the LIE standard in a general mobile communication system.

Hereinafter a process of discovering an uplink which can be applied to the LTE standard will be described with reference to FIG. 1.

Referring to FIG. 1, two terminals are required to first detect each other's existence in order to perform the D2D communication therebetween in the mobile communication system. Accordingly, each of the terminals periodically informs a surrounding area of its existence and discovers other terminals' existence at the same time. In an LTE uplink timing structure, channel resources corresponding to partial time are used for the D2D discovery as illustrated in FIG. 1. During the time, each of the terminals broadcasts its own discovery signal and receives a discovery signal transmitted from the D2D network. That is, all terminals on the D2D network generate multiple-access signals and receive multiple-access signals of other terminals.

The discovery signal is generated very similarly to a Physical Uplink Shared CHannel (PUSCH). Each of the terminals transmits the discovery signal by using one Resource Block (RB). One RB consists of fourteen symbols on the time and twelve subcarriers on the frequency. Among the fourteen symbols, the last one symbol is used for transmission-reception switching. Accordingly, each of the terminals transmits the discovery signal by using 156 Resource Elements (REs) consisting of a total of thirteen symbols and twelve subcarriers.

According to the LTE standard, there are a plurality of RBs on the frequency in the same time. The number of RBs is determined by a given bandwidth. For example, when a bandwidth of 10 MHz is given, a total of forty-four PUSCH RBs exist. Accordingly, in the LTE-D2D, a plurality of terminals transmit discovery signals in parallel in the same time through a frequency division multiple-access scheme as illustrated in FIG. 1.

Figure 2:
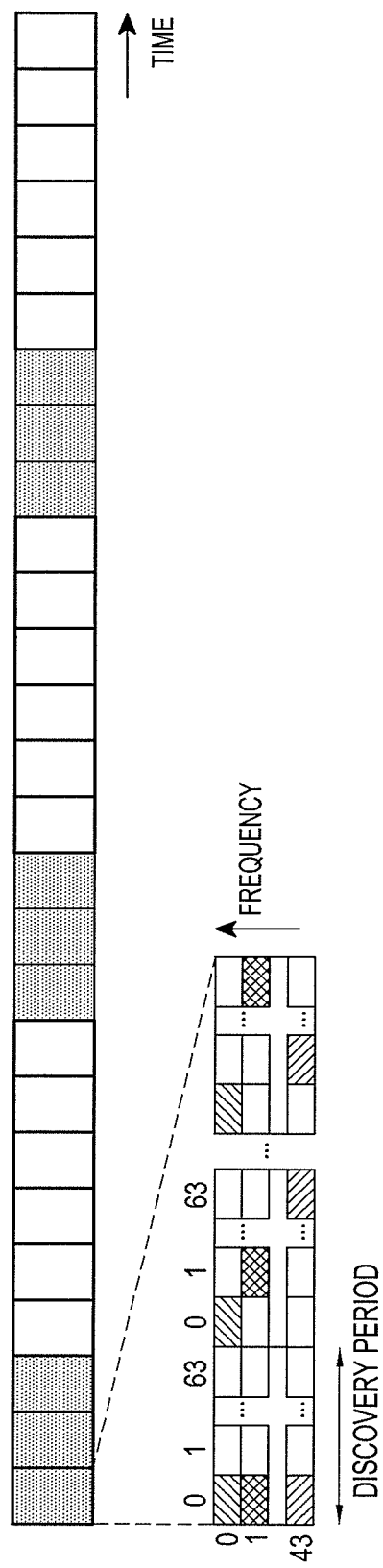
FIG. 2 illustrates an uplink timing structure to which resource selection and resource hopping are applied.

FIG. 2 illustrates an uplink timing structure to which a resource selection and a resource hopping are applied.

One discovery period consists of sixty-four RBs on the time and forty-four RBs on the frequency when a bandwidth of 10 MHz is used as illustrated in FIG. 2. Accordingly, one discovery period consists of a total 2,816 RBs. Each of the terminals cannot receive a discovery signal of another terminal at the time when the terminal itself transmits a discovery signal. Accordingly, in the next discovery period, RBs through which discovery signals are transmitted are changed according to a predetermined pattern. It is referred to as resource block hopping.

Each of the terminals generally desires to exclusively use the RBs, but a central controller (for example, a base station, an Access Point (AP), or the like) exclusively allocating resources to the terminals is not considered in the D2D network. Accordingly, each of the terminals selects one of the RBs by itself to transmit the discovery signal. At the moment when a D2D discovery process starts, for example, at the moment when power is turned on, the terminal does not transmit the discovery signal, but only receives the discovery signal broadcasted from another terminal. As described above, the terminal receives a signal transmitted from another terminal, measures energy of each RB to determine a ranking, and then randomly selects one of the RBs having a low energy to transmit the discovery signal. Such a method corresponds to a kind of collision avoidance scheme for gradually maximizing a distance between terminals which select the same RB.

Even use of a resource selection method after listening cannot perfectly prevent two or more adjacent terminals from selecting the same resource. Accordingly, in order to detect the collision, the terminal does not transmit a signal during an arbitrary one period among a plurality of discovery periods and detects an energy to identify whether another terminal transmits a signal by using the same RB. If the terminal detects that another terminal transmits a signal by using the same RB, the terminal reselects a RB to avoid the collision. It is a kind of collision detection scheme.

As described above, several multiple-access technologies are mixedly used during the LTE-D2D discovery process. In general, since each terminal of the LTE-D2D selects some resources divided based on the time-frequency from all resources to transmit the signal, a channel resource division multiple-access scheme is mainly used. In order not to select the same resource, the terminal uses a collision avoidance scheme, such as the resource selection after listening, and detects a collision while stopping the transmission of a discovery signal in a predetermined discovery period even during the transmission of the discovery signal. Further, various contention-based multiple-access schemes, such as the channel code use, are used to overcome a collision even when the collision occurs. That is, the general LTE-D2D discovery process can be a hybrid multiple-access technology.

Generating a terminal discovery signal through the general LTE-D2D technology corresponds to a type in which the contention-based multiple-access and the channel resource division multiple-access are combined. Even though each of the terminals basically passes through the resource selection process to exclusively use the frequency division resources, the collision can be generated anytime since the terminals independently perform the process. Accordingly, in order to solve the collision problem, the general LTE-D2D uses the contention-based multiple-access technology, such as collision avoidance (resource selection after listening), collision detection (recess during a predetermined discovery period), or reconstruction after the collision (a channel encoding side and successive interference cancellation).

The most serious problem of the general LTE-D2D discovery process is basically not allowing two or more terminals to select the same channel resource to transmit signals. Accordingly, the general LTE-D2D performs the hybrid multiple-access instead of the simple channel resource division multiple-access. The use of the hybrid multiple-access can cause two serious problems.

1) Complexity of the discovery process and delay generation: the general LTE-D2D does not basically allow the collision, so that each of the terminals listen signal of other terminals and performs a collision avoidance operation of selecting a channel resource. Due to the operation, the terminal cannot transmit a discovery signal, thereby generating the delay. Even though each of the terminals performs the collision avoidance operation, the collision can be generated anytime since the terminals independently perform the operation, and accordingly, the terminals are required to perform a function of detecting the operation. When the discovery signal reconstruction is failed due to the collision, a process of reselecting the resource is needed. As a result, the discovery time is delayed.

2) Discovery overhead increase: in the discovery process of the general LTE-D2D, discovery signals are carried on some subcarriers, thereby acquiring a power gain (a gain according to concentration of power and a Peak to Average Power Ratio (PAPR) gain). Accordingly, a high Signal-to-Noise Ratio (SNR) can be achieved. However, since overlapping of multiple-access signals is not allowed, if the overlapping is generated, a low Signal-to-Interference (SIR) is acquired. In a case of overlapping, a general channel code is used for an overlapping reconstruction technology, and a ½ convolutional code is used for the general LTE-D2D technology. Even though a signal generation scheme is designed to achieve a sufficiently high SNR, discovery overheads corresponding to parity increase due to the use of the channel code, and thus a resource efficiency decreases. Further, discovery overheads further increase due to a reference symbol for detecting the collision.

The present disclosure provides a multiple-access technology which has a simple process of generating and reconstructing a signal and supports a larger communication capacity in comparison with the related art. More specifically, the present disclosure provides a multiple-access technology in which, even though a plurality of transmitters transmit signals by using the same channel resource space, a receiver can effectively detect the signals and distinguish between the signals. The present disclosure can be applied to all multiple-access environments and largely includes two methods of generating and reconstructing a multiple-access signal.

1) Generation of a multiple-access signal: according to the present disclosure, each transmitter transmits information by using all or some of the given channel resources. The signal of each transmitter is mapped to an OFDM time-frequency resource space, which corresponds to a trellis modulation path. The mobile communication system according to the present disclosure allows trellis modulation paths of a plurality of transmitters to be mapped to the same resource space. That is, in an embodiment of the present disclosure, signal overlapping is allowed.

2) Reconstruction of a multiple-access signal: in order to effectively detect and distinguish between signals of a plurality of transmitters transmitted through the same channel resource space, a symbol-by-symbol message passing method and a path linking method are used. In order to more efficiently reconstruct a discovery signal, a state space expansion method, a backward pre-decoding method, and a Successive Interference Cancellation (SIC) method are considered.

The present disclosure is generally intended for a communication system based on a synchronization Orthogonal Frequency Division Multiplexing (OFDM) physical layer, but is not limited thereto. The communication system to which the present disclosure is applied includes most mobile communication systems, such as $3^{rd}$ Generation Partnership Project (3GPP) LIE, Institute of Electrical and Electronics Engineers (IEEE) 802.6 mobile MiMAX and the like, and a near field communication system, such as Wi-Fi and the like. Further, the present disclosure can be applied to all devices which desire to perform the multiple-access in the communication system based on the OFDM physical layer.

The present disclosure specifically defines a method and an apparatus for supporting the multiple-access by using the synchronization OFDM physical layer. In the multiple-access, a plurality of transmitters share the same transmission medium to transmit signals. Particularly, the present disclosure allows a plurality of terminals to use the same channel resource to transmit multiple-access signals. Accordingly, an effective operation is possible in a distributed communication system in which a central controller has difficulty in exclusively allocating orthogonal channel resources to terminals. For example, the present disclosure can increase a terminal discovery capacity during a process in which each terminal discovers an adjacent terminal in D2D communication which does not use an infrastructure, such as a base station or the like, and can be used as a core technology which makes the discovery process simple.

Hereinafter a process of generating a multiple-access signal according to a first embodiment of the present disclosure will be described.

In the first embodiment of the present disclosure, each transmitter maps information to be transmitted to an OFDM resource grid as the trellis modulation path, and a receiver reconstructs the trellis modulation path mapped by the transmitter through a message passing method, a state space expansion method, a backward pre-decoding method, and a successive interference cancellation method. A trellis modulation multiple-access scheme has an advantage of basically increasing total multiple-access capacities against another multiple-access scheme. Particularly, a device having many restraints of power or the like, such as a mobile terminal, acquires a power gain and a Peak to Average Power Ratio (PAPR) gain, and thus additionally increases transmission capacity. Further, a general multiple-access process can be simple by significantly mitigating the problem that multiple-access resources should be exclusively distributed to the terminals in a distributed communication system, such as the terminal discovery process in the D2D communication.

Figure 3:
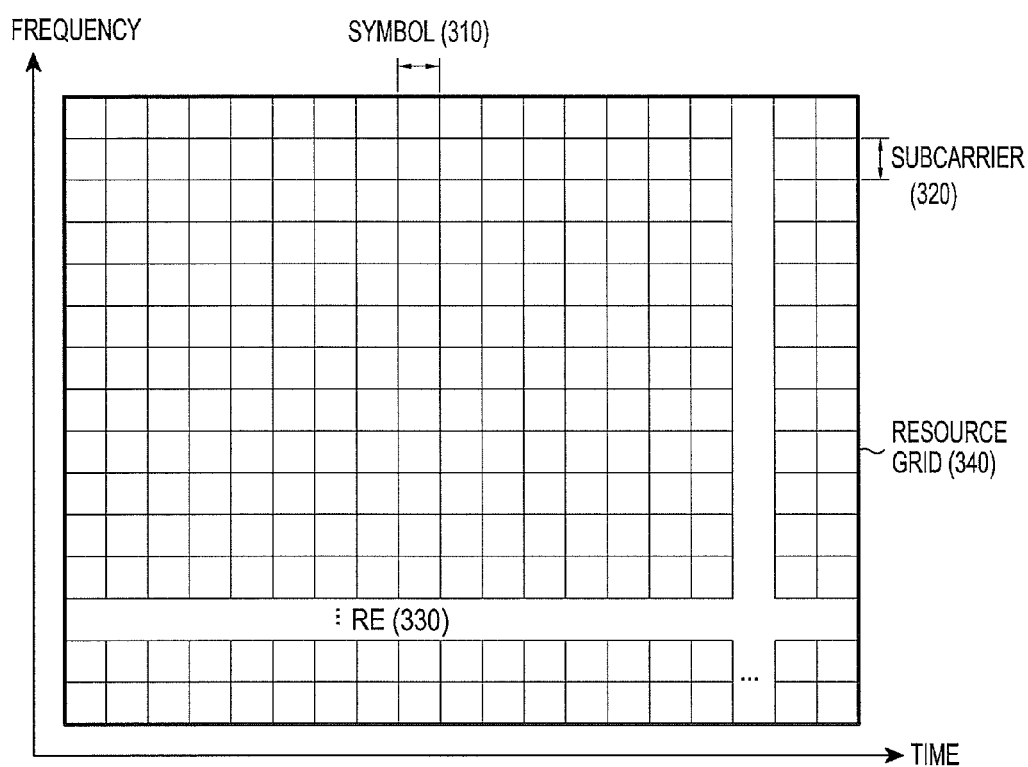
FIG. 3 illustrates a configuration of resources based on a general OFDM physical layer.

FIG. 3 illustrates a configuration of resources based on the general OFDM physical layer.

As described above, the present disclosure operates on the OFDM physical layer as illustrated in FIG. 3. Communication resources given in a corresponding environment are divided in the basic unit of time and frequencies as illustrated in FIG. 3. The resources are divided in a unit of OFDM symbol 310 on the time and in a unit of subcarrier 320 on the frequency. The communication resource consisting of one basic time-frequency unit is referred to as a Resource Element (RE) 330, and a set of REs included in the whole of communication resources is referred to as a resource grid 340. In the present disclosure, each transmitter transmits a multiple-access signal by using all or a part of the resource grid. A set of basic REs used for transmitting a multiple-access signal by each transmitter is referred to as a multiple-access resource slot, and the multiple-access resource slot will be referred to as a "resource slot" hereinafter. A size of the resource slot in the present disclosure is determined such that REs included in one resource slot experience very similar channel link environments when a signal is transmitted. A resource block having a similar concept to the resource slot consists of seven OFDM symbols on the time and twelve subcarriers on the frequency in the 3GPP LIE standard, and accordingly, one resource block consists of a total of eighty-four REs.

In the present disclosure, the number of transmitters that transmit signals through one resource slot can be singular or plural. Particularly, when two or more transmitters transmit signals by using the same resource slot, a receiver distinguishes and reconstructs the signals. That is, the present disclosure allows signals of a plurality of transmitters to overlap each other in the same resource. Such a characteristic is distinguished from a contention-based multiple-access technology, such as Carrier Sense Multiple Access/Collision Detection (CSMA/CD), Carrier Sense Multiple Access/Collision Avoidance (CSMA/CA) or the like, or various multiple-access technologies, such as Time Division Multiple Access (TDMA), Frequency Division Multiple Access (FDMA), Orthogonal Frequency Division Multiplexing Access (OFDMA) and the like.

A first embodiment of the present disclosure described below is an embodiment including a multiple-access signal generation method, and a second embodiment of the present disclosure is an embodiment including a multiple-access signal reconstruction method.

Figure 4:
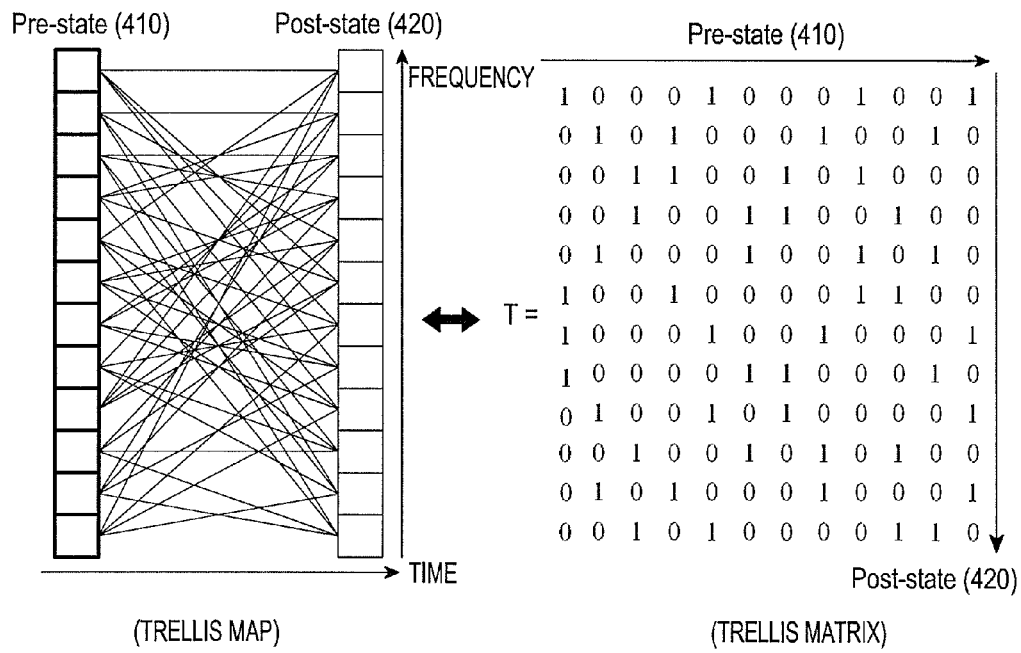
FIG. 4 is a diagram illustrating a trellis map and a trellis matrix according to a first embodiment of the present disclosure.

FIG. 4 is a diagram illustrating a trellis map and a trellis matrix according to the first embodiment of the present disclosure.

A multiple-access signal of each transmitter according to the first embodiment of the present disclosure is generated based on the trellis map. The trellis map can be designed by the transmitter beforehand, extracted using a memory, or given to the transmitter. Further, the present disclosure is based on the premise that the trellis map is shared by all components of the communication system, such as a terminal, a base station, and the like. The trellis map of FIG. 4 is a regular bipartite graph and matches one trellis matrix in a one to one correspondence. The trellis map includes two types of state sets and connection lines connecting the two state sets. One of the two types of state sets is referred to as a pre-state 410 and the other is referred to as a post-state 420. $N_S$, which means the number of pre-states and the number of post-states, is determined as a multiple of $N_F$ corresponding to the number of subcarriers included in the resource slot, that is, $_cN_F$. In $_cN_F$, c is a constant. The numbers of connection lines connected to each of the pre-states 410 and each of the post-states 420, that is, degrees are all the same and are determined according to a size of information to be transmitted through one state transition. If b-bit information is to be mapped through one state transition, the degree d is determined as $2^b$. In $2^b$, b denotes the number of bits to be transmitted through one state transition between symbols.

For example, when 2 bits are transmitted, b is 2 and d is 4. When 3 bits are transmitted, b is 3 and d is 8. When 4 bits are transmitted, b is 4 and d is 16. At this time, the degree cannot be larger than the number of states $N_S$, and accordingly, a size of information to be transmitted through one state transition is limited. The trellis map is configured to generate as few small cycles as possible. That is, the trellis map is designed to make a size of the cycle included in the trellis map be the maximum regardless of what method is used.

According to the configuration of the trellis map of FIG. 4, a size of the time of the resource slot, that is, the number of OHM symbols $N_T$ included in the resource slot is determined. When a size of total information to be transmitted through the multiple-access is "B" and a size of information transmitted through one state transition is "b", $N_T$ OFDM symbols included in the resource slot is basically equal to or larger than [B/b]. The total information can be a codeword generated through at least one of an error detection encoding and an error correction encoding or can be message information which has not passed through the error correction encoding. However, a codeword having passed through the error detection encoding, such as a Cyclic Redundancy Check (CRC) code, is basically used. For example, when total information to be transmitted is 150 bits and 2 bits are mapped by using a trellis map having the degree of 4 through one state transition, a minimum of seventy-five OFDM symbols on the time configure one resource slot.

Figure 5:
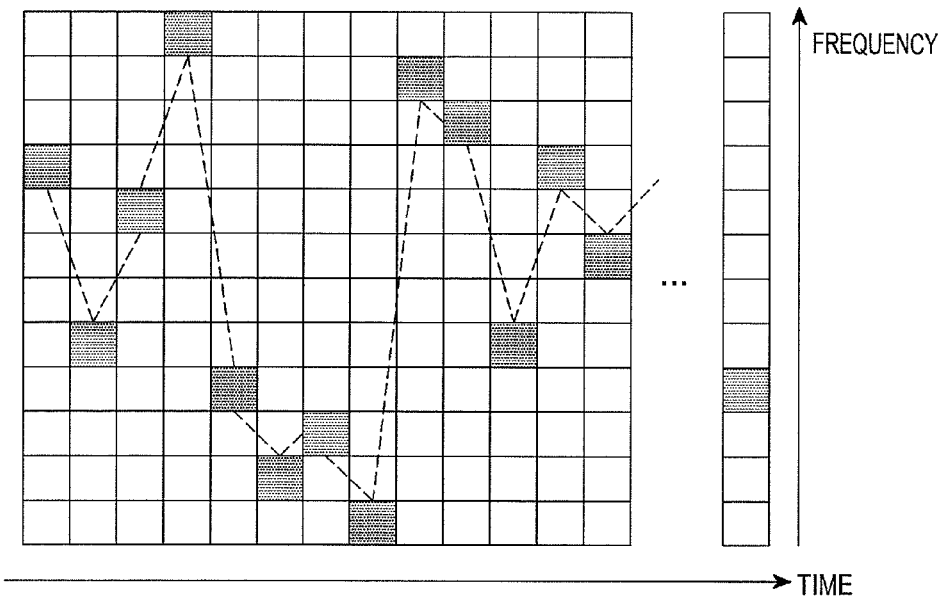
FIG. 5 illustrates an example of trellis modulation path mapping according to the first embodiment of the present disclosure.

FIG. 5 illustrates an example of trellis modulation path mapping according to the first embodiment of the present disclosure.

Each transmitter generates a signal on a resource slot $N_S \times N_T$ based on one of a trellis map designed beforehand, a trellis map extracted using a memory, and a trellis map given to the transmitter. At this time, each transmitter carries the signal on one subcarrier per OHM symbol to transmit the signal as illustrated in FIG. 5, which is referred to as "single-tone signal generation". The single-tone signal generation has advantages in many ways. First, it is possible to acquire a power gain by concentrating much transmission power on one subcarrier. Further, the transmitter can efficiently use a linear amplification area (dynamic range) of a power amplifier by reducing a Peak-to-Average Power Ratio (RAPA). Particularly, such an advantage can more effectively act in a condition where a mobile terminal having limited power and calculation capacity, such as an uplink of the mobile communication system, generates a multiple-access signal.

When transmitter $X_i$ carries a signal on the resource slot having a size of $N_S \times N_T$, a position of a subcarrier carrying the signal in a $t^{th}$ OFDM symbol is "$f_i(t)$". Accordingly, transmitter $X_i$ carries a signal on positions of a total of $N_T$ REs, such as $(f_i(1), 1), (f_i(2), 2), (f_i(N_T), N_T)$. As illustrated in FIG. 5, since the REs carrying the signal seem to establish one path, it is referred to as a "trellis modulation path".

A process in which transmitter $X_i$ generates the trellis modulation path according to the trellis map and the information to be transmitted is described below.

Figure 6:
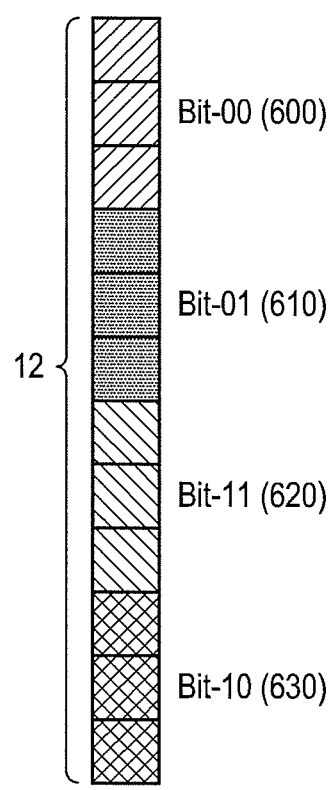
FIG. 6 illustrates an example of the determination of an initial reference state according to 2-bit information according to the first embodiment of the present disclosure.
Figure 7:
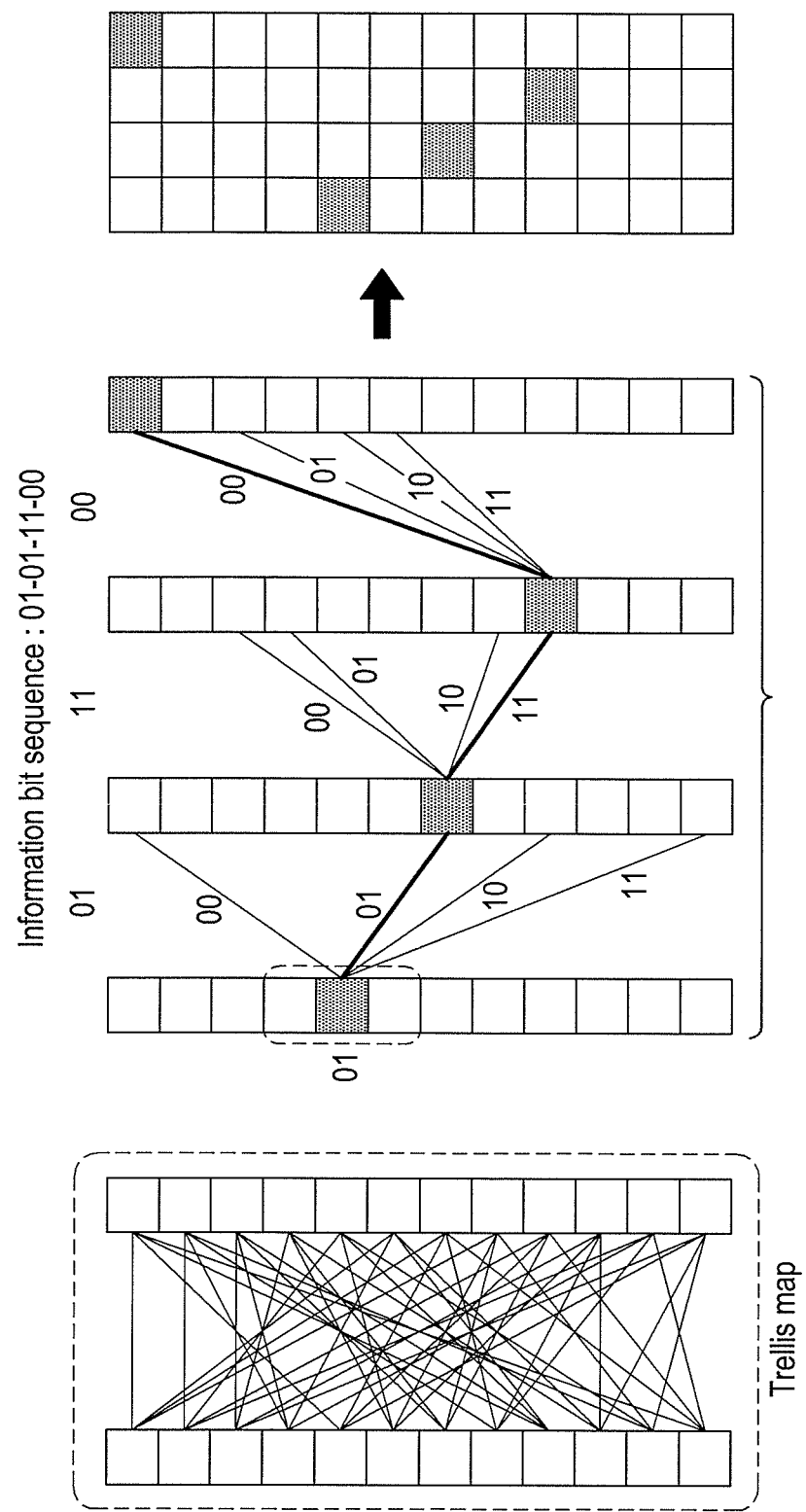
FIGS. 7A to 7C illustrate examples of a trellis modulation path generation process according to the first embodiment of the present disclosure.

FIG. 6 illustrates an example of the determination of an initial reference state based on 2-bit information according to the first embodiment of the present disclosure.

First, transmitter Xi determines a position $f_i(1)$ of a subcarrier to carry a signal in a first OFDM symbol. As described above, the position $f_i(1)$ of the subcarrier selected on the first OFDM symbol corresponds to an initial reference state, which can be determined by various standards.

The initial reference state can be determined by a part of information to be transmitted. For example, when $N_S$ corresponding to the number of states is 12, the initial reference state can express information from 1 bit to 3 bits. When 2-bit information is expressed by the initial reference state, areas of the initial reference state which can be determined according to corresponding 2 bits (for example, "00" bits 600, "01" bits 610, "11" bits 620, and "10" bits) can be determined as illustrated in FIG. 6. The areas of the initial reference state according to respective bit values do not need to be physically close to each other. As described above, when the areas of the initial reference state are determined, one subcarrier is selected as $f_i(1)$ according to a particular standard. In contrast, a part of information does not necessarily need to be expressed by the initial reference state.

FIGS. 7A to 7C illustrate an example of a trellis modulation path generation process according to the first embodiment of the present disclosure.

After the initial reference state is determined, the transmitter determines subcarrier positions $f_i(2), \ldots, f_i(N_T)$ in MUM symbols after a second OFDM symbol based on one of the trellis map determined beforehand, the trellis map extracted using the memory, and the trellis map given to the transmitter. When each state of the trellis map has the degree $d=2^b$, $f_i(t)$ is determined by partial information of b bits and a function of a position $f_i(t-1)$ of a previous state.

The trellis map of FIG. 7A has a state transition pattern which can be transitioned from $f_i(t-1)$. The initial reference state of one of the corresponding areas is determined by initial 2 bits as illustrated in FIG. 7B, and the state transition is made in a unit of 2 bits as illustrated in FIG. 7C. As described above, when the set of REs (fi(1), 1), (fi(2), 2), . . . , (fi(NT), NT) to carry the signal is determined, an actual physical signal is carried on corresponding positions. At this time, values of the physical signals included in respective REs can be the same for each RE or vary depending on a particular rule. One of Biphase Shift Keying (BPSK) signals can be carried on all REs or two of the BPSK signals can be alternately carried on all REs.

When a size of total bits to be transmitted is "B" and $b_{init}$ is a size of bits expressed by the initial reference state, the remaining $b_{trans}$ ($b_{trans}=B-b_{init}$) is mapped as the state transition. When the degree of the trellis map is d and the state transition is indicated by b=log 2d bits, the size $N_T$ of the resource slot on the time can be determined as $\lceil b_{trans}/b \rceil$ That is, $N_T$ is determined as $\lceil b_{trans}/b \rceil +1$.

Figure 8:
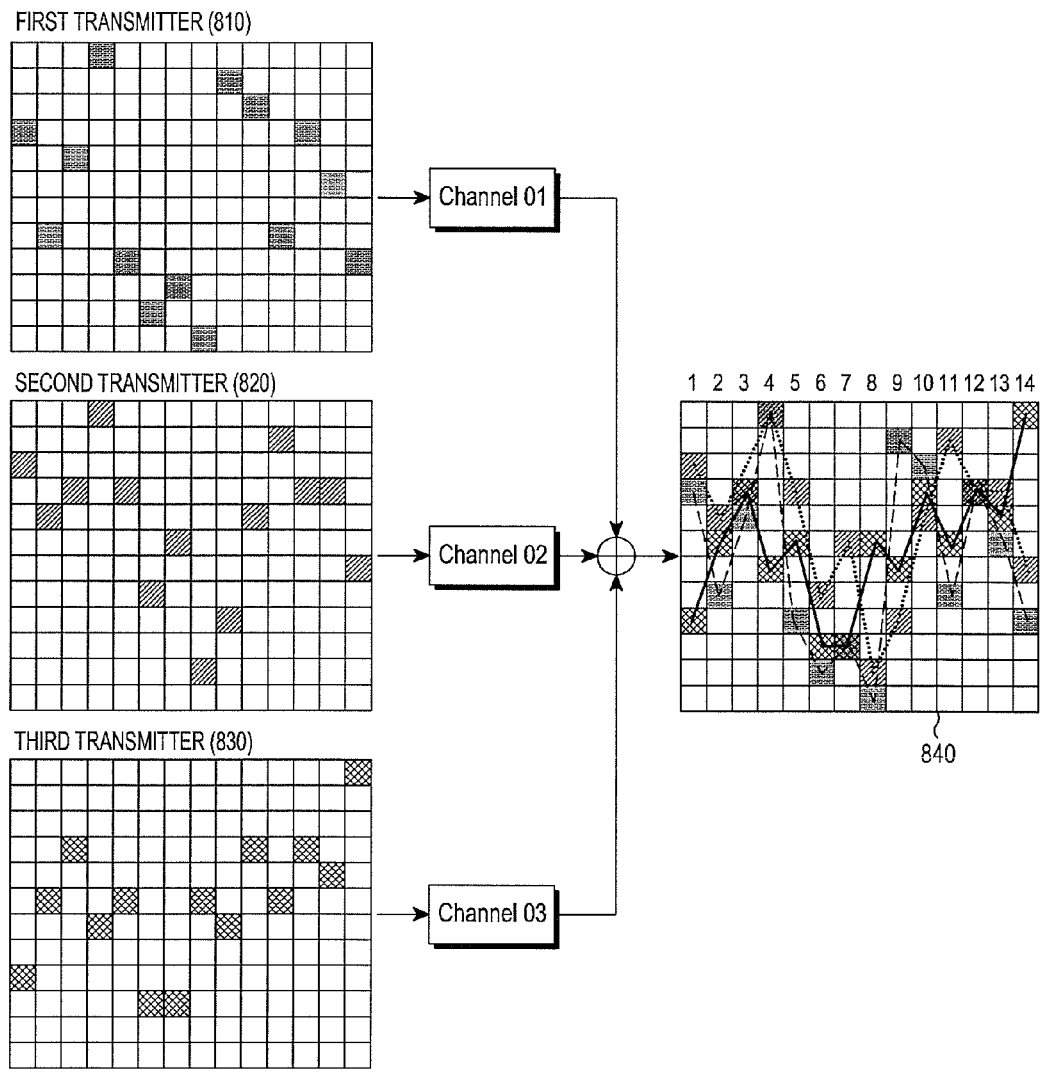
FIG. 8 illustrates a trellis modulation multiple-access transmission environment according to the first embodiment of the present disclosure.

FIG. 8 illustrates a trellis modulation multiple-access transmission environment according to the first embodiment of the present disclosure.

In FIG. 8, $N_F$ corresponding to the number of subcarriers on a frequency axis is designed such that all symbols of the resource slot of each transmitter (a first transmitter 810, a second transmitter 820, or a third transmitter 830) experience the same channel in terms of frequency. Further, it is designed such that channels which successive symbols on a time axis experience are very slowly changed.

Trellis modulation paths of the transmitters can be transmitted through the same resource slot as illustrated in FIG. 8. For example, when (t, $f_i(t)$) and (t, $f_j(t)$) generated by two transmitters $X_i$ and $X_j$ are the same, signals of the two transmitters overlap each other in the corresponding RE. That is, in the present disclosure, signals of two or more transmitters can be transmitted while partially overlapping each other by using the same resource space, such as slots 3, 4, 7, and 12 as indicated by a reference numeral 840 of FIG. 8. In slot 12 of the reference numeral 840 of FIG. 8, the signals of all of the first transmitter 820, the second transmitter 830, and the third transmitter 840 are transmitted by using the same slot while overlapping each other.

As the number of transmitters transmitting multiple-access signals by using the same resource slot is larger, such an overlapping phenomenon is more frequently generated. In the present disclosure, a method by which the receiver distinguishes the transmitters in the overlapping symbol is an important issue, which will be described in detail according to a second embodiment of the present disclosure.

Hereinafter a multiple-access signal reconstruction process according to the second embodiment of the present disclosure will be described.

The receiver receives multiple-access signals transmitted through one or a plurality of resource slots. Trellis modulation paths of one or a plurality transmitters can be mapped to each resource slot, and the receiver performs a reconstruction process to distinguish between the signals. A signal to which Trellis modulation paths of one or a plurality transmitters are mapped is allowed to be transmitted by a plurality of transmitters using the same channel resource space.

The multiple-access signal transmitted through the trellis modulation path has the following two characteristics.

First, all REs $(f_i(1), 1), (f_i(2), 2), (f_i(N_T), N_T)$ of the trellis modulation path carried on the resource slot by transmitter $X_i$ experience very similar channel link environments. Particularly, channel link environments which adjacent REs $(f_i(t), t)$ and $(f_i(t+1), t+1)$ experience are nearly the same.

Second, each state transition pattern can be determined by a previous state position (that is, previous symbol) and information (that is, information bit) mapped to the corresponding transition pattern. This means that a trellis modulation path $(f_i(1), (f_i(2), 2), (f_i(N_T), N_T)$ of each transmitter corresponds to a Markov process.

Figure 9:
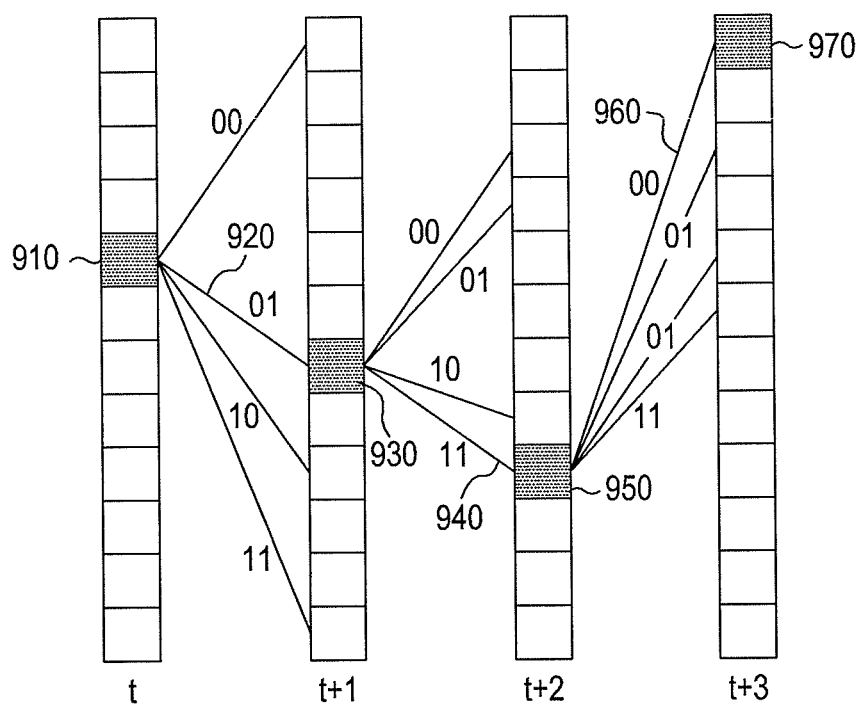
FIG. 9 illustrates an example of a trellis modulation path reconstruction process according to a second embodiment of the present disclosure.

FIG. 9 illustrates an example of a trellis modulation path reconstruction process according to the second embodiment of the present disclosure.

In the present disclosure, the reconstruction process is performed based on the characteristic of the trellis modulation path as described in the first embodiment of the present disclosure. As illustrated in FIG. 9, the receiver detects trellis modulation paths generated by one or a plurality of transmitters and detects a transition pattern between states made by each subcarrier on two adjacent OFDM symbols in order to distinguish between signals of the transmitters. Since the trellis modulation path generated by each transmitter corresponds to the Markov process, state transition detection processes are independently performed symbol-by-symbol. Further, since the trellis modulation path generated by each transmitter corresponds to the Markov process, the state transition is determined by a previous symbol (for example, a reference numeral 910) and an information bit (for example, a reference numeral 920).

The receiver uses a message passing scheme in order to detect a state transition pattern between two ODM symbols in a first sub embodiment of the second embodiment of the present disclosure. That the REs of the trellis modulation path generated by transmitter Xi experience very similar channel link environments as illustrated in FIG. 8 has been described before. In the second embodiment of the present disclosure, by using such a characteristic, the overlapping of signals of a plurality of transmitters or separation of the overlapping signals can be detected through the message passing method.

In the present disclosure, the message passing is performed to detect a state transition pattern between a $t^{th}$ OFDM symbol and a $t+1^{th}$ OFDM symbol.

Figure 10:
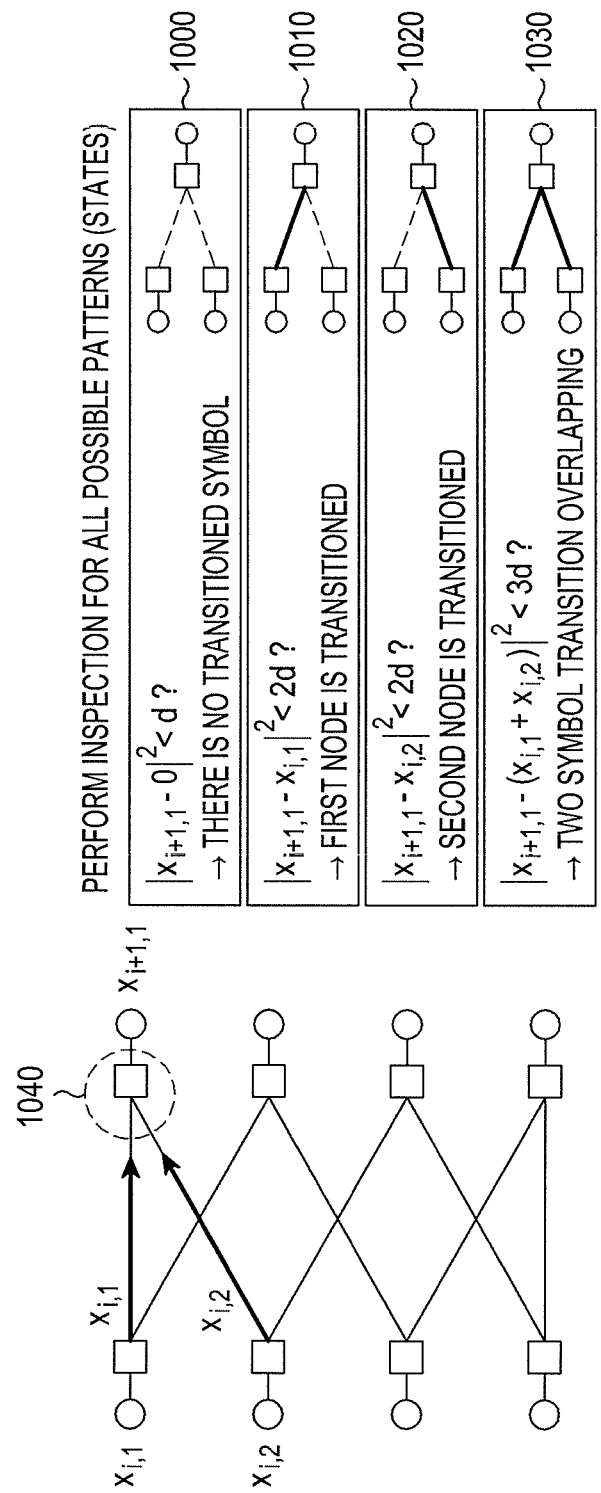
FIG. 10 illustrates an example of a state satisfaction pattern inspection process according to the second embodiment of the present disclosure.

FIG. 10 illustrates an example of a state satisfaction pattern inspection process according to the second embodiment of the present disclosure.

First, each pre-state directly transmits a symbol value corresponding to a corresponding RE to a post-state. It is inspected, based on the message value transmitted from the connected pre-state, whether a pattern satisfied with each post-state exists. As illustrated in FIG. 10, when the degree of each state is 2, a total of four patterns are inspected.

In a case of a first available pattern 1000, when "$|x_{i,1}-0|^2 < \delta$" is satisfied based on a post-state 1040, it is determined that there is no transitioned symbol.

In a case of a second available pattern 1010, when "$|x_{i,1}-x_{i+1,1}|^2 < 2\delta$" is satisfied based on the post-state 1040, it is determined that a first node is transitioned.

In a case of a third available pattern 1020, when "$|x_{i,1}-x_{i+1,2}|^2 < 2\delta$" is satisfied based on the post-state 1040, it is determined that a second node is transitioned.

In a case of a fourth available pattern 1030, when "$|x_{i,1}-(x_{i+1,2}+x_{i+1,1})|^2 < 3\delta$" is satisfied based on the post-state 1040, it is determined that "two symbols are transitioned and two symbols overlap". Two symbol transition overlapping refers to overlapping of two symbols. "$\delta$" denotes a threshold which is determined according to a power of background noise, and can be determined by a statistical characteristic of thermal noise measured by an external band (non-used area outside the band used for transmitting a signal).

As a result of the pattern inspection, when there is at least one satisfaction pattern among the four patterns, each post-state directly transmits a value corresponding to the corresponding pattern to the pre-state. However, when the four patterns do not include any satisfaction pattern, the post-state generates and transmits a message to each pre-state. The satisfaction pattern inspection is performed for each pre-state having received the message equally to the post-state, and a message to be transmitted to the post-state is determined. When which patterns satisfied with all of the pre-states and the post-states are found, the corresponding patterns are determined as paths and the message passing is terminated. When the patterns satisfied with all the states are not found through the predetermined number of message passings, only the path of the found satisfaction pattern is detected and the message passing is terminated.

FIGS. 11 to 16 illustrate an example of an operation of a message passing algorithm according to the second embodiment of the present disclosure.

Figure 11:
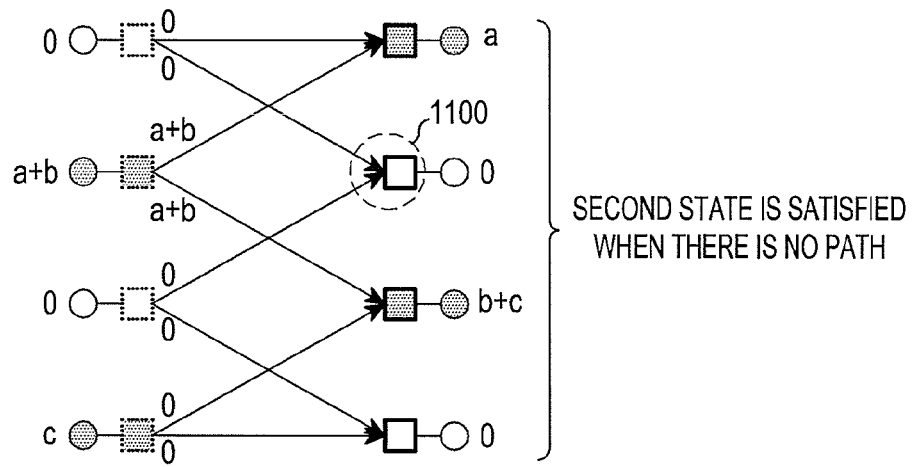
FIGS. 11 to 16 illustrate examples of an operation of a message passing algorithm.

In a case of FIG. 11, each pre-state transmits a pre-state message of a first iterative decoding to each post-state. In FIG. 11, a reference numeral 1100 indicates a case where a post-state satisfies a second state when there is no path.

Figure 12:
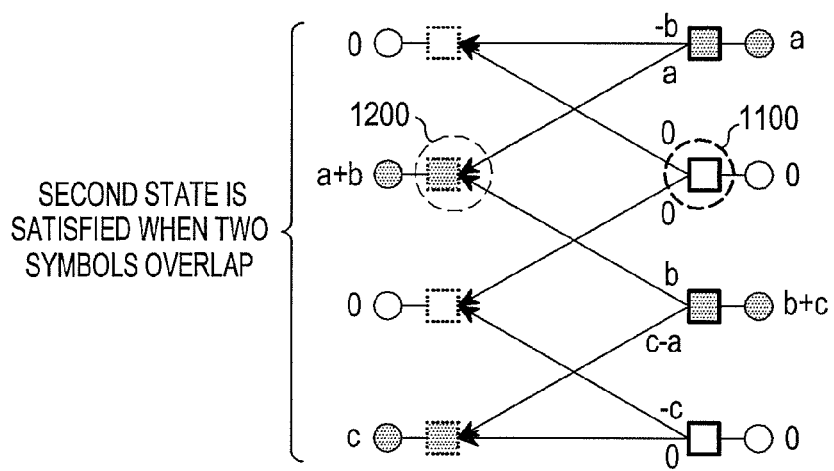

In a case of FIG. 12, each post-state transmits a post-state message of a first iterative decoding to each pre-state. In FIG. 12, a reference numeral 1200 indicates a case where a pre-state satisfies a second state when two symbols overlap.

Figure 13:
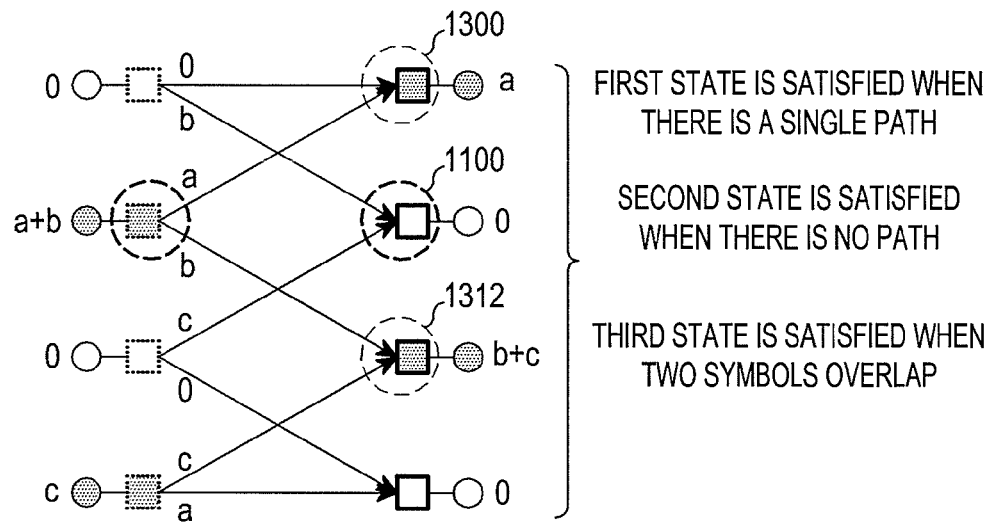

In a case of FIG. 13, each pre-state transmits a pre-state message of a second iterative decoding to each post-state. In FIG. 13, a reference numeral 1300 indicates a case where a first state is satisfied when there is a single path, a reference numeral 1100 indicates a case where a second state is satisfied when there is no path, and a reference numeral 1312 indicates a case where a third state is satisfied when two symbols overlap.

Figure 14:
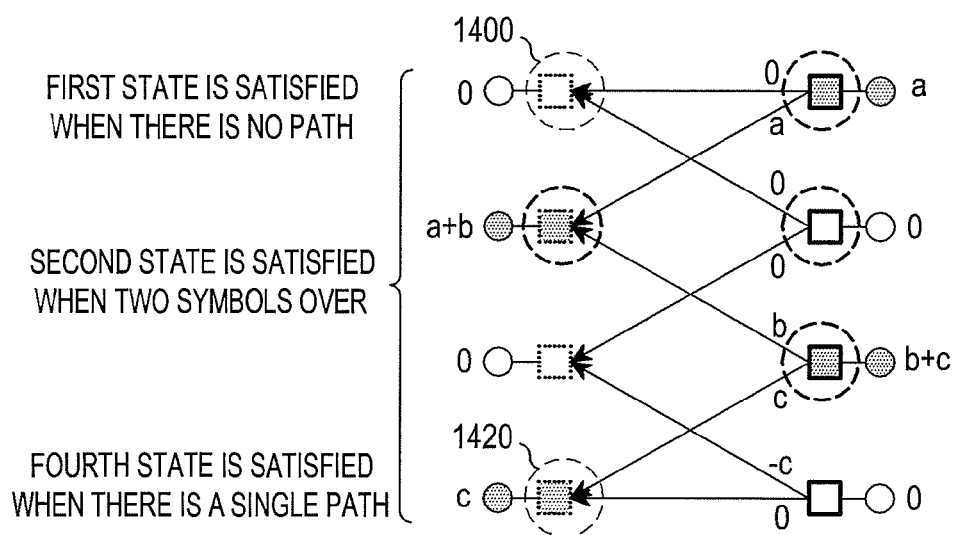

In a case of FIG. 14, each post-state transmits a post-state message of a second iterative decoding to each pre-state. In FIG. 14, a reference numeral 1400 indicates a case where a first state is satisfied when there is no path. In FIG. 14, a reference numeral 1420 indicates a case where a fourth state is satisfied there is a single path.

Figure 15:
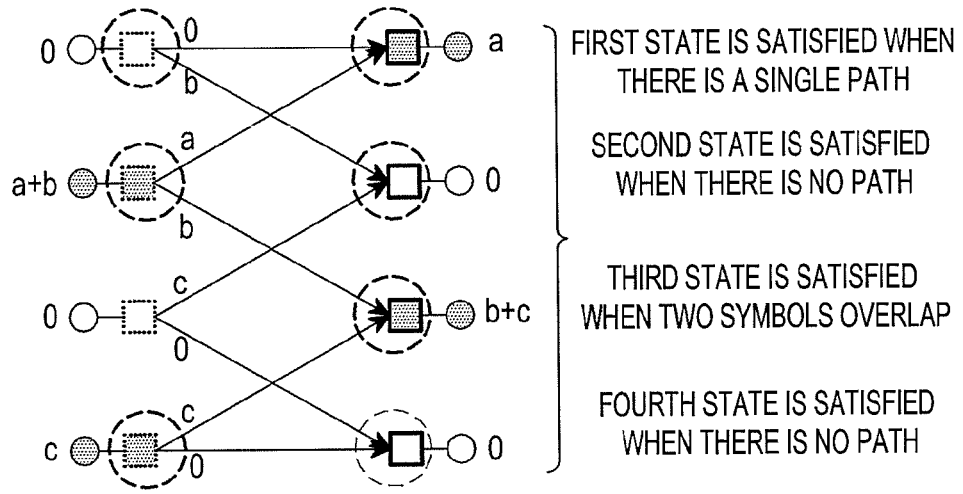

In a case of FIG. 15, each pre-state transmits a pre-state message of a third iterative decoding to each post-state.

Figure 16:
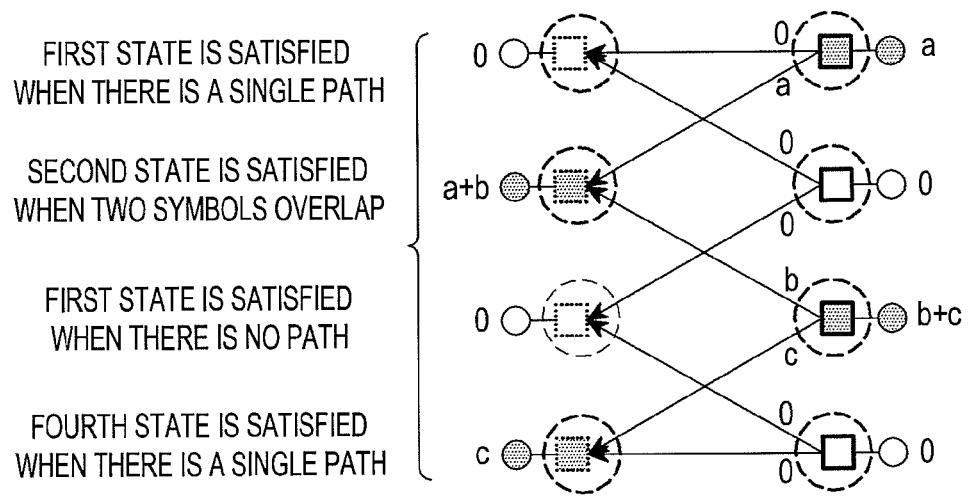

In a case of FIG. 16, each post-state transmits a post-state message of a third iterative decoding to each pre-state. As described above, when the state transition pattern between symbols is detected through the message passing, a path linking process that connects independently acquired state transition results is performed. Then, a CRC inspection is performed on all the acquired potential connections.

Figures 17A, 17B:
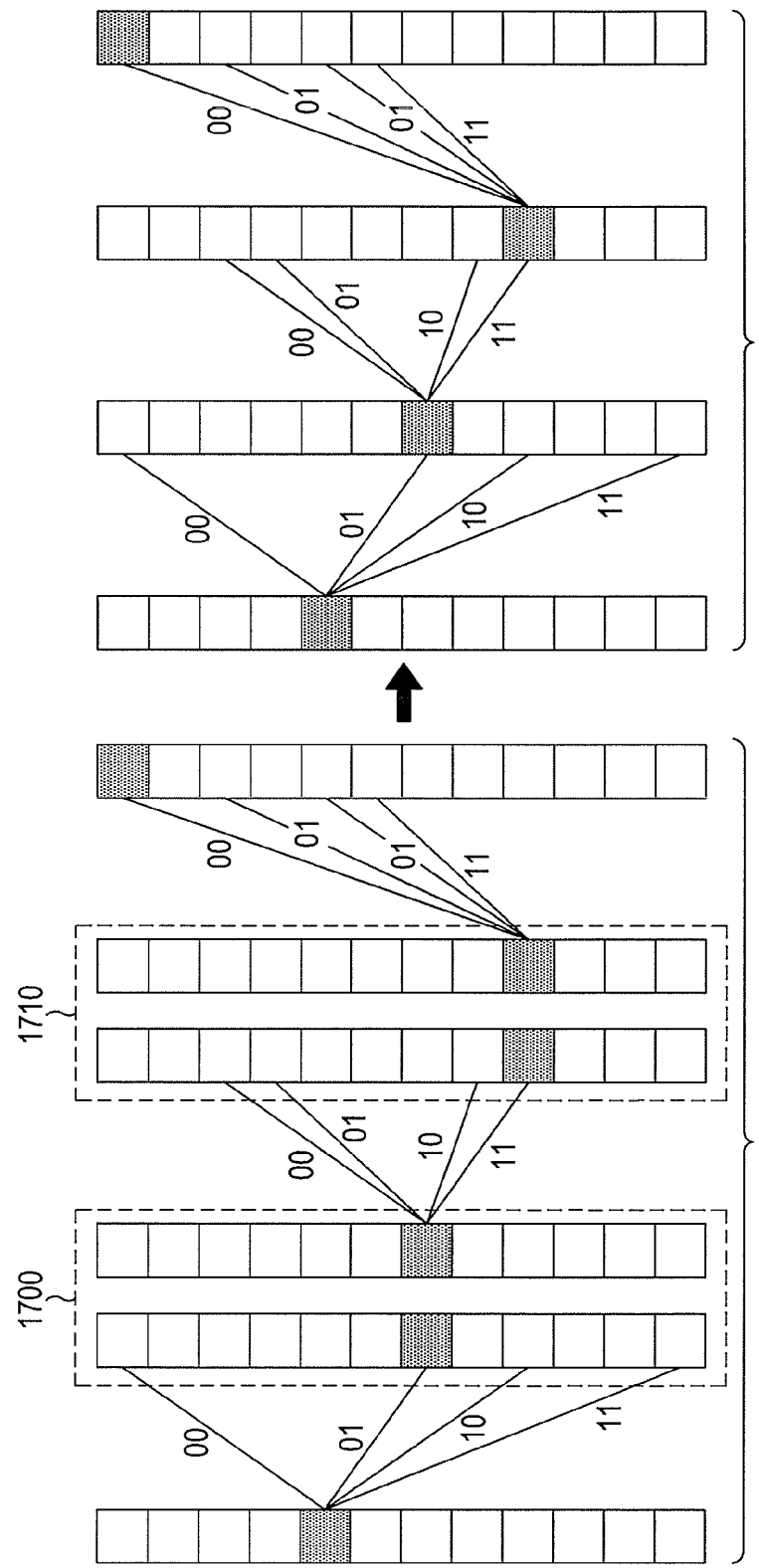
FIGS. 17A and 17B illustrate examples of a path connection process of connecting reconstructed paths according to a first sub embodiment of the second embodiment of the present disclosure.

FIGS. 17A and 17B illustrate an example of a path connection process that connects reconstructed paths according to a first sub embodiment of the second embodiment of the present disclosure.

As illustrated in FIG. 17B, the state transitions acquired between symbols are connected with reference to the state transition acquired between previous symbols as indicated by reference numerals 1700 and 1710. A result of the path connection is illustrated in FIG. 17B.

FIGS. 18A to 18C illustrate a reconstruction method when a pattern is lost in the reconstruction according to the first sub embodiment of the second embodiment of the present disclosure.

A symbol which does not acquire a state transition result is processed as erasure and can be reconstructed by a process of decoding an error correction code, such as a Reed Solomon (RS) code. Alternatively, as illustrated in FIGS. 18A to 18C, an erased path can be randomly reconstructed with reference to a configuration of the trellis map. That is, when the pattern is erased as illustrated in FIG. 18A, paths are compared with reference to the configuration of the trellis map as illustrated in FIG. 18B, and thus the erased paths can be randomly reconstructed as illustrated in FIG. 18C.

All trellis modulation paths acquired using the transition pattern detection and the path connection according to the message passing scheme provided by the first sub embodiment of the second embodiment of the present disclosure are converted to bistreams. Then, the validity of the paths is inspected by performing a Cyclic Redundancy Check (CRC) error detection inspection on each of the acquired bistreams. That is, an effective codeword is acquired from all bitstreams for all paths acquired through the CRC code inspection.

Figure 19:
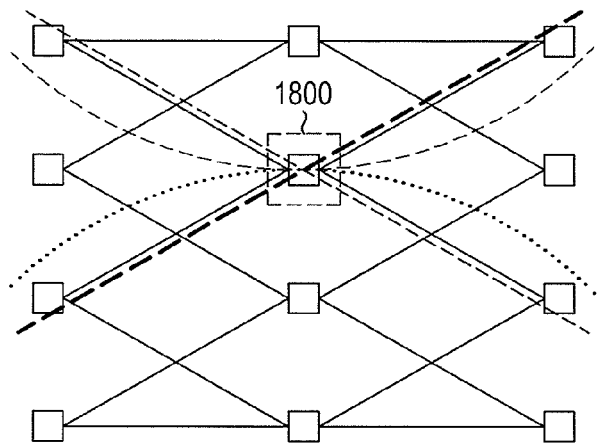
FIG. 19 illustrates a result according to separation after overlapping.

FIG. 19 illustrates a result according to the separation after the overlapping.

As indicated by a reference numeral 1800, as the paths are potentially increased due to the separation after the overlapping by using the simple message passing method, a fatal problem in terms of decoding complexity of the receiver is generated. Further, as the number of transmitters generating signals in the same resource slot is larger, the number of potential paths to pass through the CRC inspection are exponentially increased. Accordingly, the decoding complexity of the receiver is significantly increased. For example, when four terminals overlappingly transmit messages of 150 bits, there are about 30,780 potential codewords.

Further, when a complex path configures a cycle by using the simple message passing method, the same message repeatedly circulates, and thus a decoding result cannot be known.

Meanwhile, when two or more signals overlap and then are separated, the receiver generates paths in consideration of all possible cases since the receiver cannot distinguish between the signals.

Accordingly, as indicated by the reference numeral 1800, the number of potential paths are increased two times or more whenever the separation after the overlapping is generated.

Figures 20A, 20B:
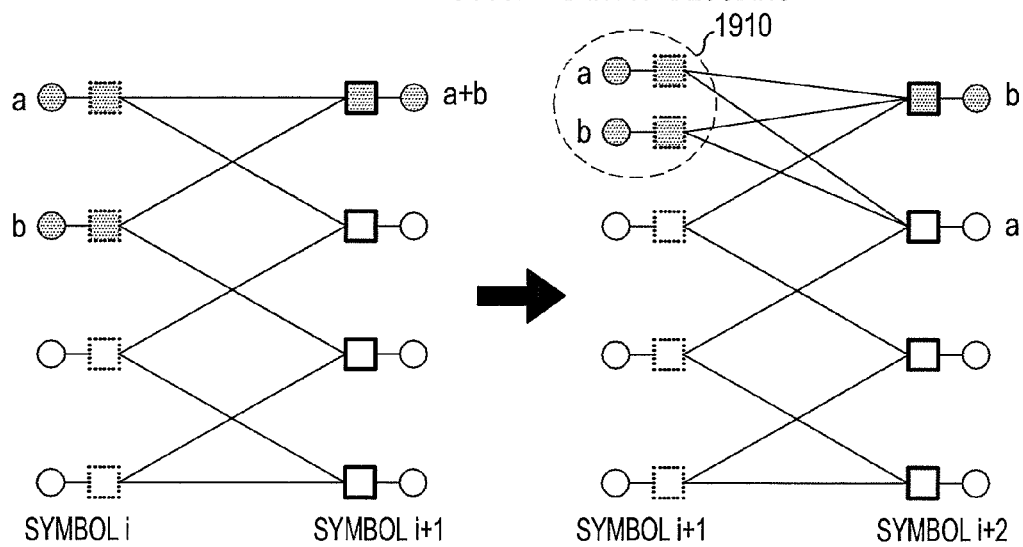
FIGS. 20A, 20B and 21 illustrate an example of a state space expansion based on overlapping according to a second sub embodiment of the second embodiment of the present disclosure.
Figure 21:
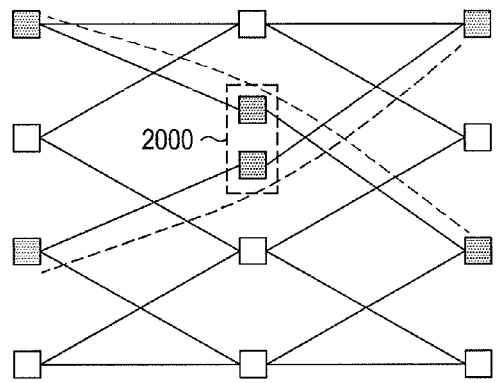

FIGS. 20A, 20B and 21 illustrate an example of a state space expansion based on the overlapping according to a second sub embodiment of the second embodiment of the present disclosure.

In order to solve the problem in which the number of paths are increased according to the separation after the overlapping by using the simple message passing method, expanding the state space according to the overlapping in each message passing process between symbols is considered.

As illustrated in FIG. 20A, when the receiver identifies overlapping paths in a decoding between symbol i and symbol i+1, the receiver can grasp a value of each of the overlapping signals and overlapping positions. As illustrated in FIG. 20B, when the receiver performs the message passing process between symbol i+1 and symbol i+2, the state space expansion scheme is used. The trellis map is reconfigured by using a state space expansion scheme.

When a message is transmitted from symbol i to symbol i+1, the overlapping is generated in symbol i+1. Accordingly, when a message is transmitted from symbol i+1 to symbol i+2, the state division corresponding to the number of overlapping symbols, that is, symbol a and symbol b is made as indicated by a reference number 1910. The state space expansion reduces the decoding complexity by dividing the overlapping symbol to distinguish paths as indicated by a reference numeral 2000 of FIG. 21. That is, in comparison with the reference numeral 1800 of FIG. 19, the reference numeral 2000 of FIG. 21 can reduce the decoding complexity and clearly distinguish between signals by dividing the overlapping symbols and expanding the state space.

Figures 22A, 22B:
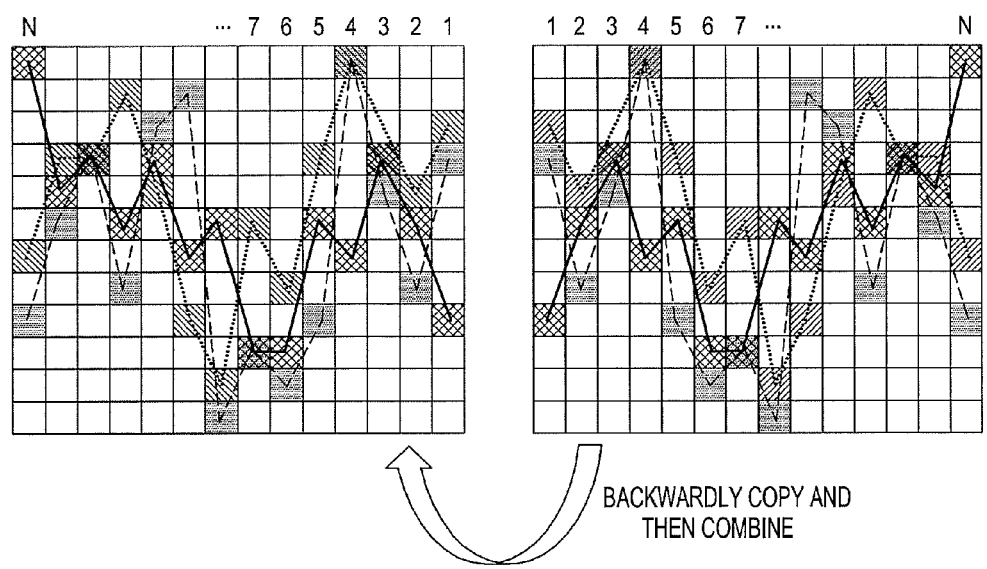
FIGS. 22A, 22B and 23 illustrate a backward pre-decoding method according to a third sub embodiment of the second embodiment of the present disclosure.
Figure 23:
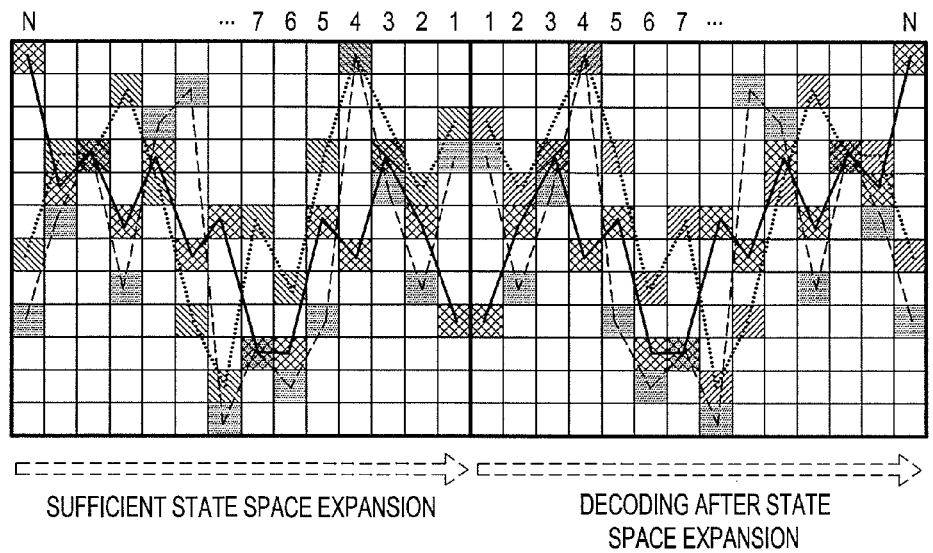

FIGS. 22A, 22B and 23 illustrate a backward pre-decoding method according to a third sub embodiment of the second embodiment of the present disclosure.

Since the state space expansion can be performed when the message passing between previous symbols has been executed, the state space expansion cannot be applied to the message passing between a first symbol and a second symbol. That is, when path overlapping is generated between the first symbol and the second symbol, the decoding capability can be reduced and the decoding complexity can be increased. Accordingly, the backward pre-decoding is performed to execute the state space expansion from the first symbol.

First, as illustrated in FIGS. 22A and 22B, a received resource grid is reversed on a time axis, the reversed resource grid is combined with the existing resource grid (that is, the resource grid is backwardly copied and then is combined), and then the message passing process is performed from the reversed resource grid. When the decoding is performed using the backwardly configured trellis map, the state space expansion is sufficiently achieved when the decoding of the first symbol is actually performed. At this time, a size of the resource grid reversed backwardly can be all or a part of the resource grid.

Figure 24:
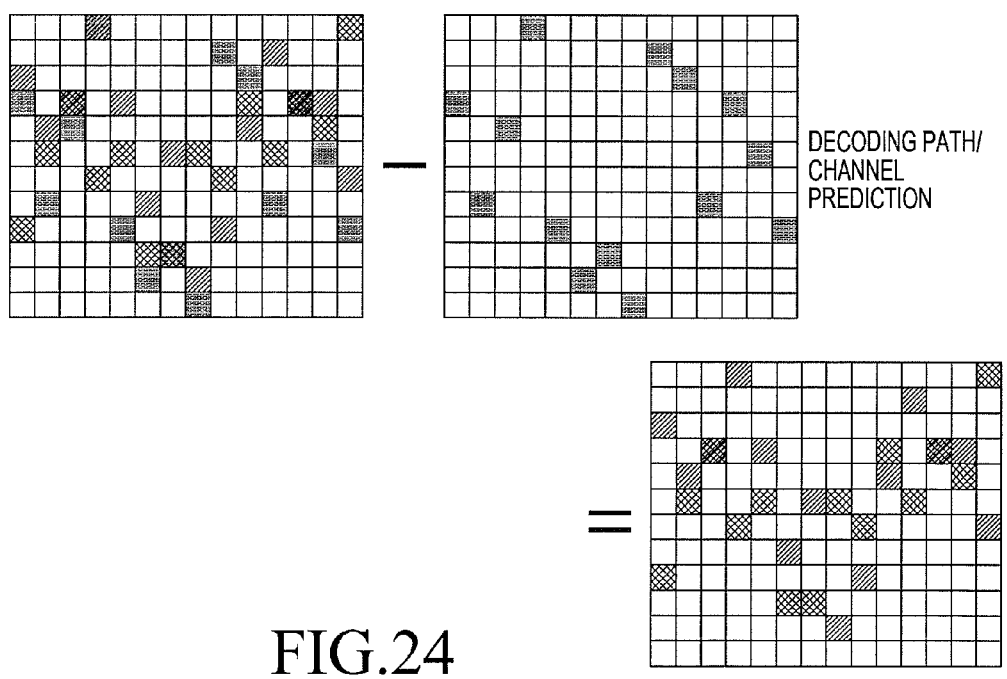
FIGS. 24 to 26 illustrate a successive interference cancellation method according to a fourth sub embodiment of the second embodiment of the present disclosure.
Figure 25:
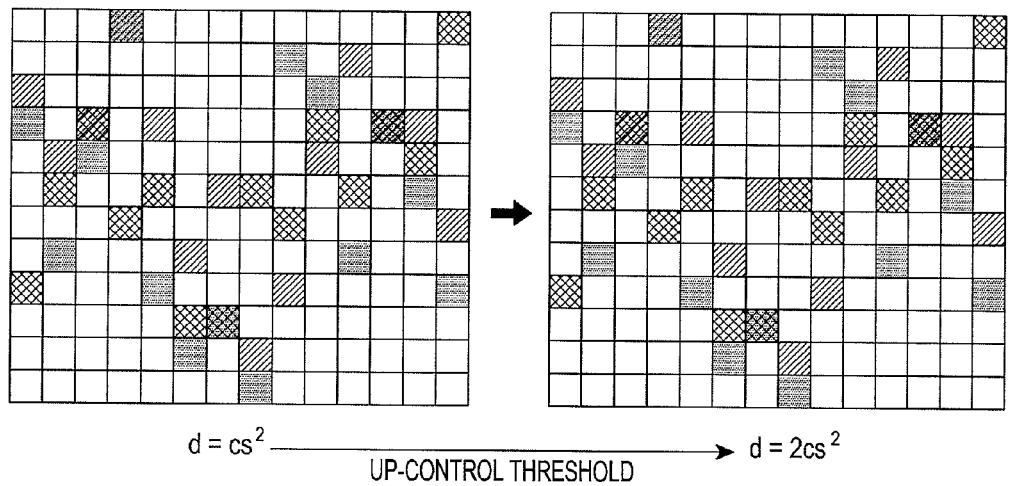
Figure 26:
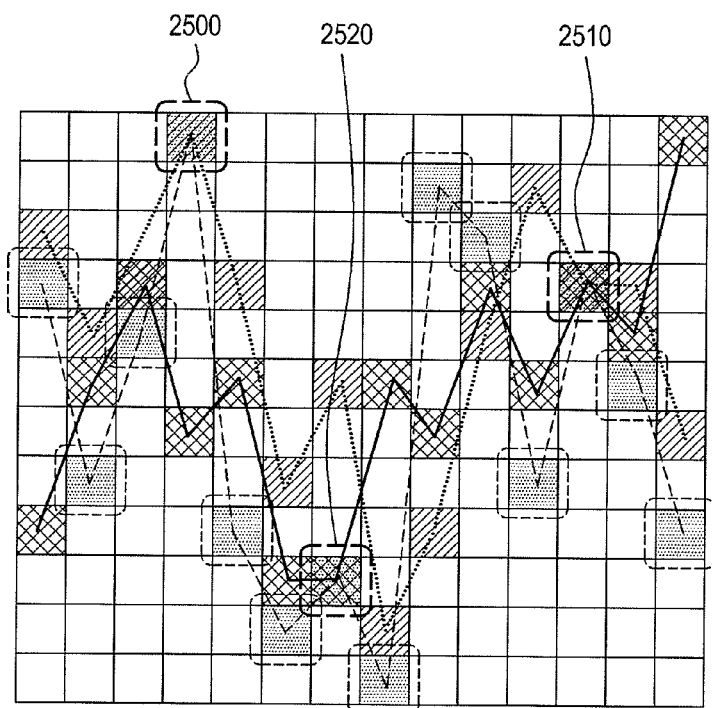

FIGS. 24 to 26 illustrate a successive interference cancellation method according to a fourth sub embodiment of the second embodiment of the present disclosure.

Referring to FIG. 24, when the receiver detects only a part of a plurality of signals generated in one resource slot, the information detection capability can be increased by removing the detected part and thus reducing an overlapping path in comparison with the initially received signal. Such a method is generally called "Successive Interference Cancellation (SIC)".

Referring to FIG. 25, the decoding method according to the second embodiment of the present disclosure can have a different decoding result according to a threshold during the message passing process. The threshold is determined as a multiple of a power average of noise. Accordingly, when no path is detected after one decoding, the decoding can be performed again after up-controlling the threshold.

Referring to FIG. 26, the decoding method according to the second embodiment of the present disclosure can detect whether tones detected through the state space expansion method overlap.

In a case of a single tone (non-overlapping tone), a channel gain value can be directly acquired. However, in a case of overlapping tones 2500, 2520, and 2510, a channel gain value can be acquired by averaging a weighted-sum from channel gain values acquired by adjacent tones (previous tones and next tones) of the overlapping tones.

Figure 27:
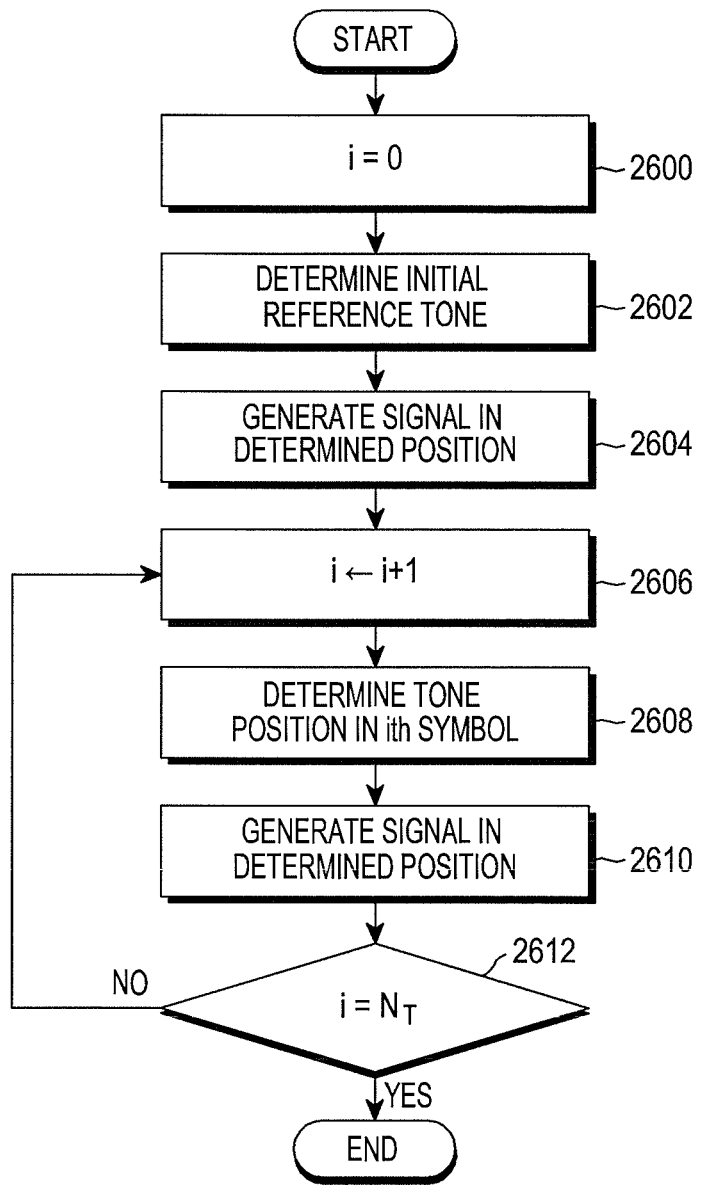
FIG. 27 is a flowchart illustrating a multiple-access signal generation method according to the first embodiment of the present disclosure.

FIG. 27 is a flowchart illustrating a multiple-access signal generation method according to the first embodiment of the present disclosure.

The transmitter identifies that a current symbol is a first OFDM symbol corresponding to i=0 in step 2600. In step 2602, an initial reference tone position is determined in the first OFDM symbol. In the present disclosure, the initial reference tone position can be determined using first 2-bit information. In the present disclosure, a size of bits to be transmitted is B, and the initial reference tone position can be determined using a part of information $b_{init}$. In the present disclosure, the initial reference tone position can be randomly determined after reception of a signal of another terminal to avoid the overlapping.

Thereafter, the transmitter generates a signal in the determined position in step 2604.

When signal generation corresponding to i=0 is completed, the transmitter identifies that a current symbol is a second OFDM symbol corresponding to i+1 in order to determine a tone position in the next symbol i+1 in step 2606. First, the transmitter determines a tone position in an $i^{th}$ symbol in step 2608. The tone position is determined based on an $i-1^{th}$ tone position corresponding to the previous symbol and the part of information b. The pattern which can be transitioned is identified with reference to the pre-configured trellis map. Thereafter, the transmitter generates a signal in the determined position in step 2610. The transmitter determines whether i is $N_T$ in step 2612.

When i is $N_T$, the transmitter ends the operation. When i is not $N_T$, the transmitter returns to step 2606 and repeats steps 2606 to 2612 until i becomes $N_T$.

Figure 28:
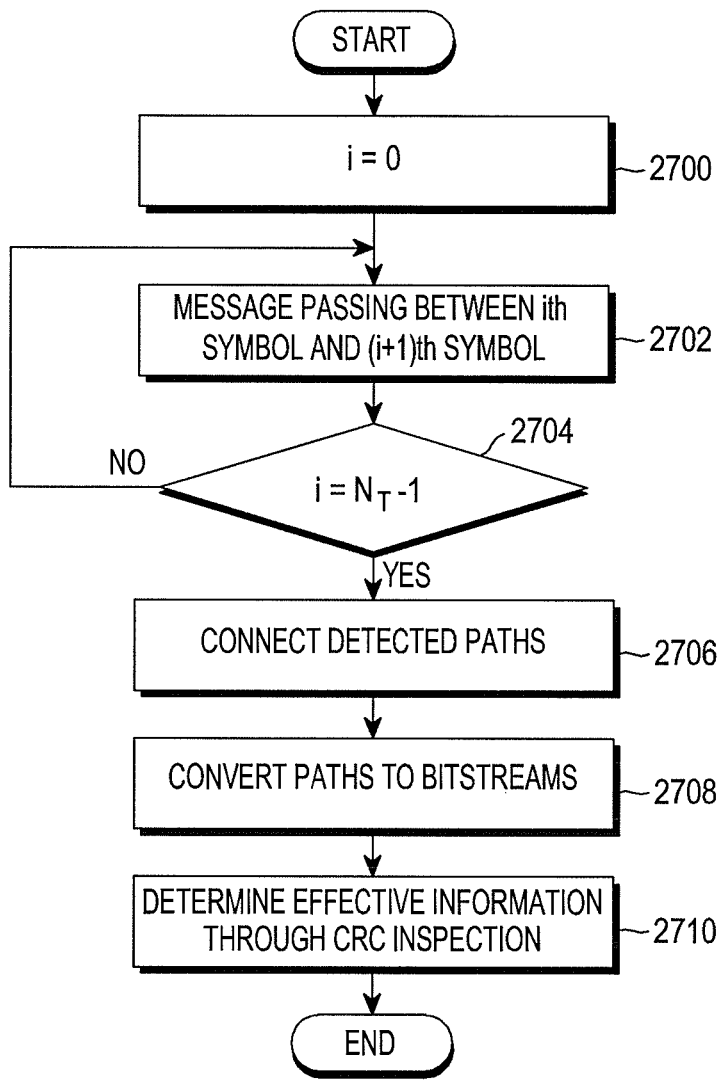
FIG. 28 is a flowchart illustrating a multiple-access signal reconstruction method according to the second embodiment of the present disclosure.

FIG. 28 is a flowchart illustrating a multiple-access signal reconstruction method according to the second embodiment of the present disclosure.

First, when the receiver receives a signal from the transmitter, the receiver identifies that a current symbol is a first OFDM symbol corresponding to i=0 in step 2700. In step 2702, the receiver performs the message passing process between an $i^{th}$ symbol and an i+1 symbol as described in the first sub embodiment of the second embodiment of the present disclosure. The receiver determines whether i is $N_T-1$ in step 2704. When i is not $N_T-1$, the receiver returns to step 2702. However, when i is $N_T-1$, the receiver detects the transition pattern according to the message passing process as described above and combines paths in step 2706. Then, the receiver converts all the detected trellis modulation paths to bitstreams in step 2708. The receiver performs a CRC error detection inspection on each of the converted bitstreams to detect validity in step 2710. That is, effective codewords are acquired from all the bitstreams for the acquired paths through the CRC code inspection.

Figure 29:
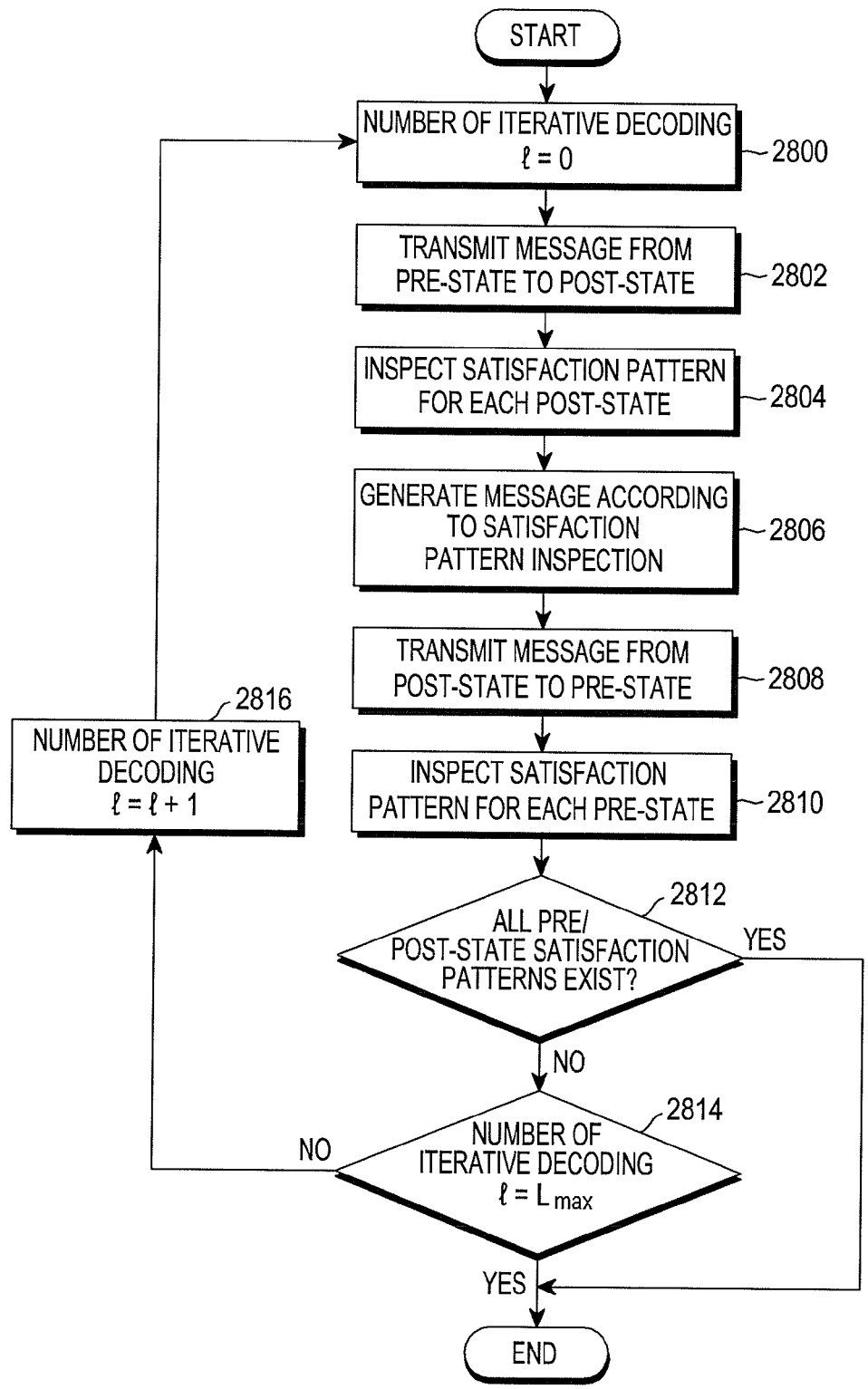
FIG. 29 is a flowchart illustrating a decoding method using a message passing method according to the first sub embodiment of the second embodiment of the present disclosure.

FIG. 29 is a flowchart illustrating a decoding method using the message passing method according to the first sub embodiment of the second embodiment of the present disclosure.

In order to detect a state transition pattern between a $t^{th}$ OFDM symbol and a $t+1^{th}$ OFDM symbol, the following message passing process is performed.

First, the transmitter sets the number of iterative decoding to "0 (1=0)" in step 2800. Then, in a pre-state, the transmitter directly transmits a message to a post-state connected to a symbol value corresponding to a RE corresponding to the pre-state in step 2802. Thereafter, the transmitter inspects a satisfaction pattern for each post-state in step 2804, and generates a message according to the satisfaction pattern inspection in step 2806. The transmitter transmits the generated message from the post-state to the pre-state in step 2808. The transmitter performs a satisfaction pattern inspection for each pre-state in step 2810. The transmitter determines whether there are satisfaction patterns for all the pre-states and the post-states. When the satisfaction pattern exists, the transmitter ends the process. When the satisfaction pattern does not exist, the transmitter determines whether the number of iterative decodings is set to a maximum value (1=Lmax) in step 2814. When the number of iterative decodings is maximum, the transmitter ends the process. When the number of iterative decodings is not maximum, the transmitter sets the number of iterative decoding to "1=L+1" and proceeds to step 2802.

Figure 30:
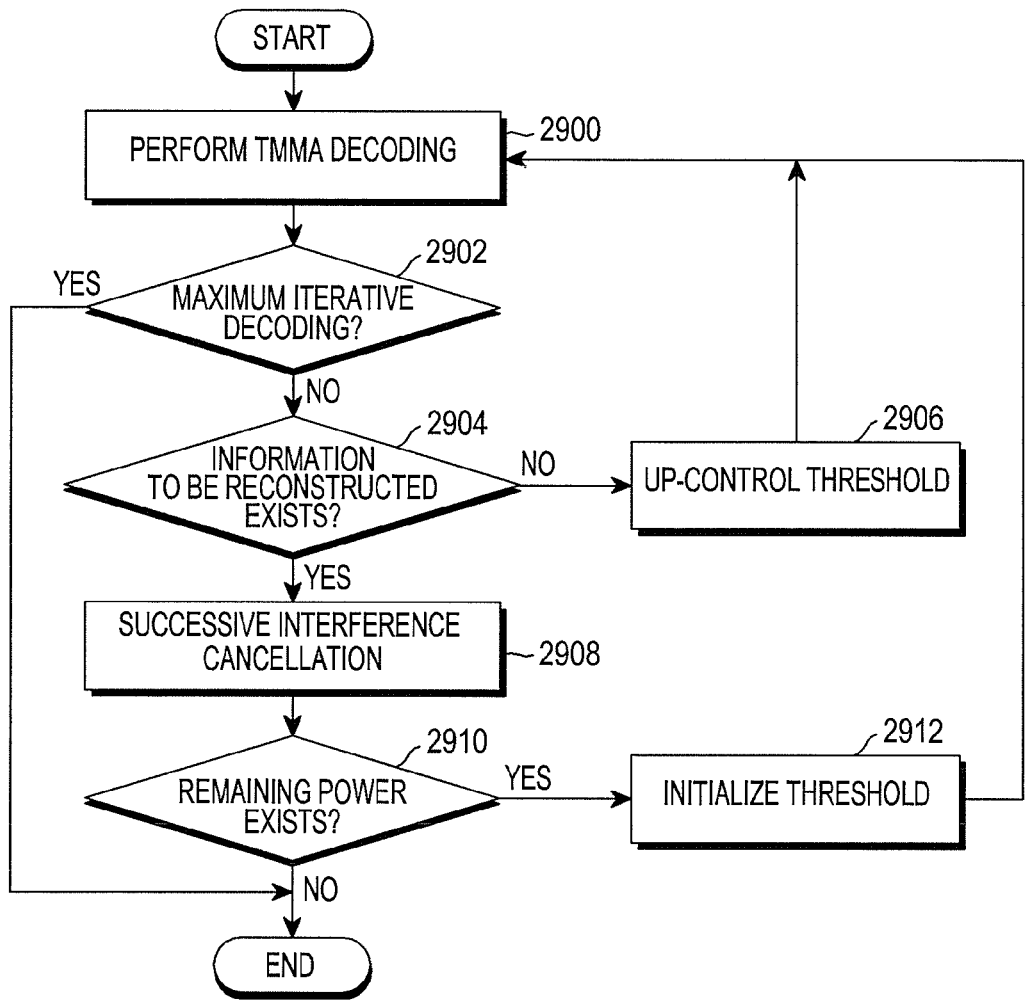
FIG. 30 is a flowchart illustrating a successive interference cancellation method according to the fourth sub embodiment of the second embodiment of the present disclosure.

FIG. 30 is a flowchart illustrating a successive interference cancellation method according to the fourth sub embodiment of the second embodiment of the present disclosure.

First, the receiver performs a Trellis Modulation Multiple Access (TMMA) decoding in step 2900, and determines whether it is a maximum iterative decoding in step 2902. When the TMMA decoding is the maximum iterative decoding, the receiver ends the process. When the TMMA decoding is not the maximum iterative decoding, the receiver determines whether there is information to be reconstructed in step 2904. When there is no information to be reconstructed, the receiver up-controls a threshold in step 2906.

In contrast, when there is information to be reconstructed, the receiver performs the successive interference cancellation operation according to the fourth sub embodiment of the second embodiment of the present disclosure in step 2908, and determines whether there is remaining power in step 2910 after completing the successive interference cancellation operation. When there is remaining power after the interference cancellation, the receiver initializes the threshold in step 2912. When there is no remaining power, the receiver ends the process.

Figure 31:
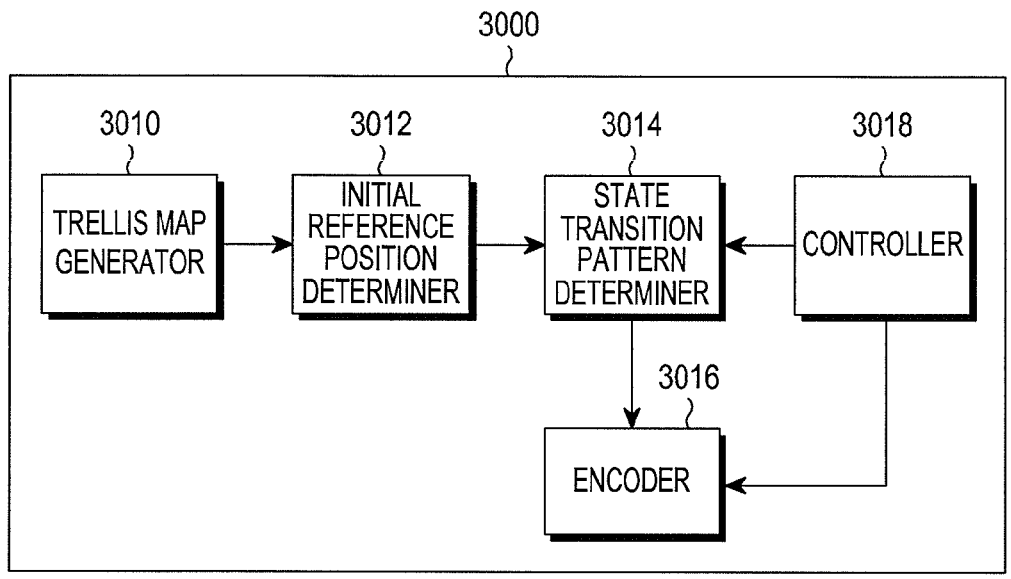
FIG. 31 illustrates a block diagram of a multiple-access signal generation apparatus according to the first embodiment of the present disclosure.

FIG. 31 is a block diagram illustrating a multiple-access signal generation apparatus according to the first embodiment of the present disclosure.

A multiple-access signal generation apparatus 3000 includes a trellis map generator 3010, an initial reference position determiner 3012, a state transition pattern determiner 3014, an encoder 3016, and a controller 3018.

The trellis map generator 3010 configures a trellis map to which a multiple-access signal of each transmitter will be transmitted, and generates a signal on the resource slot based on the configured trellis map.

The initial reference position determiner 3012 determines an initial reference tone position by using first 2-bit information.

The state transition pattern determiner 3014 determines a state transition pattern by a previous symbol position and information bits mapped to the corresponding transition pattern The encoder 3016 encodes mapped OFDM symbols based on the state transition pattern determined by the controller 308 and the state transition pattern determiner 3014.

The controller 3018 makes a control such that the OFDM symbols are encoded according to the state transition pattern determined by the state transition pattern determiner 3014.

Figure 32:
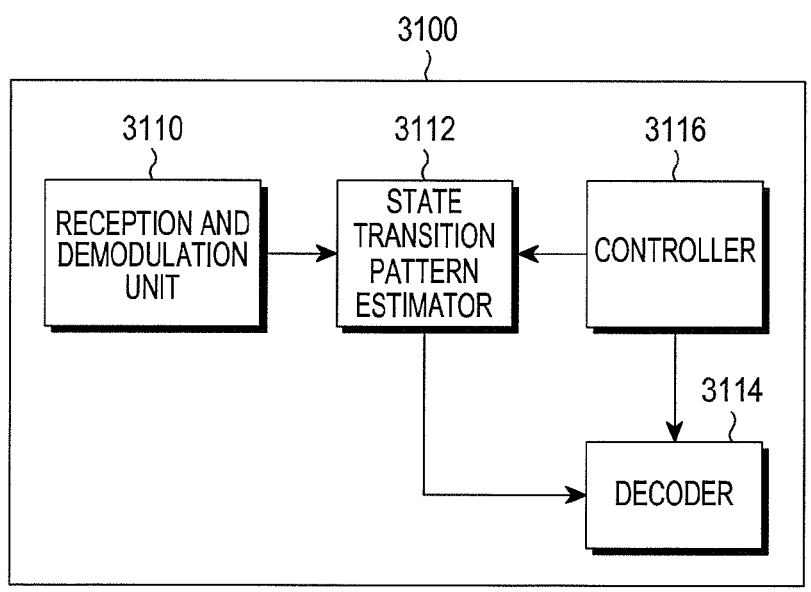
FIG. 32 illustrates a block diagram of a multiple-access signal reconstruction apparatus according to the second embodiment of the present disclosure.

FIG. 32 is a block diagram illustrating a multiple-access signal reconstruction apparatus according to the second embodiment of the present disclosure.

The multiple-access reconstruction apparatus of FIG. 32 can be applied to all of the first sub embodiment to fourth sub embodiment of the second embodiment of the present disclosure.

A multiple-access signal reconstruction apparatus 3100 includes a reception and demodulation unit 3100, a state transition pattern estimator 3112, a decoder 3114, and a controller 3116.

The reception and demodulation unit 3100 receives and demodulates a signal. The demodulated signal is transmitted to the state transition pattern estimator 3112.

The state transition pattern determiner 3112 estimates a state transition pattern from the demodulated signal by using a previous symbol position and information bits mapped to the corresponding transition pattern.

The decoder 3114 reconstructs the multiple-access signal generated by the multiple-access signal generation apparatus based on the state transition pattern estimated by the state transition pattern estimator 3112.

The controller 3116 controls operations of the state transition pattern estimator 3112 and the decoder 3114 to reconstruct the multiple-access signal generated by the multiple-access signal generation apparatus.

The present disclosure is based on the physical uplink shared channel of 3GPP LIE, and an example of a network environment is as follows.

Network size: a network size includes a circular cell having a radius of 500 m.

Receiver: a receiver includes a single base station located at the origin.

Transmitter: a transmitter includes N transmission terminals uniformly distributed within a circular cell, and N terminals use given communication resources. Further, the transmitter includes a transmission terminal transmitting information of 150 bits (including 16-bit CRC) to the base station.

Channel model: a channel model includes an ITU-R P.1411-1 path loss model.

The related art corresponds to an environment where uplink resources of 3GPP LIE divided on the frequency are used. Each transmission terminal transmits a multiple-access signal by using one RB (thirteen OFDM symbols and twelve subcarriers). The transmission terminal performs a ½ convolutional encoding and a QPSK modulation on a message having a 150-bit length to generate 150 symbols and maps the 150 symbols to 150 REs. Four REs of the remaining six REs are used for transmitting a pilot for a channel prediction, and two REs are used for a null symbol for detecting the collision. When two or more signals overlap, the base station uses the SIC to distinguish and reconstruct the overlapping signals.

The present disclosure considers that all transmission terminals transmit signals to the resource slot consisting of seventy-five OFDM symbols and twelve subcarriers. Accordingly, each transmitter according to the present disclosure uses the resource space which is about 5.4 times larger than the transmitter according to the related art. For the compensation for such a difference and a fair comparison, the related art considers environments where five and six RBs are used (five and six RBs in a graph of FIG. 34 correspond to the related art).

Figure 33:
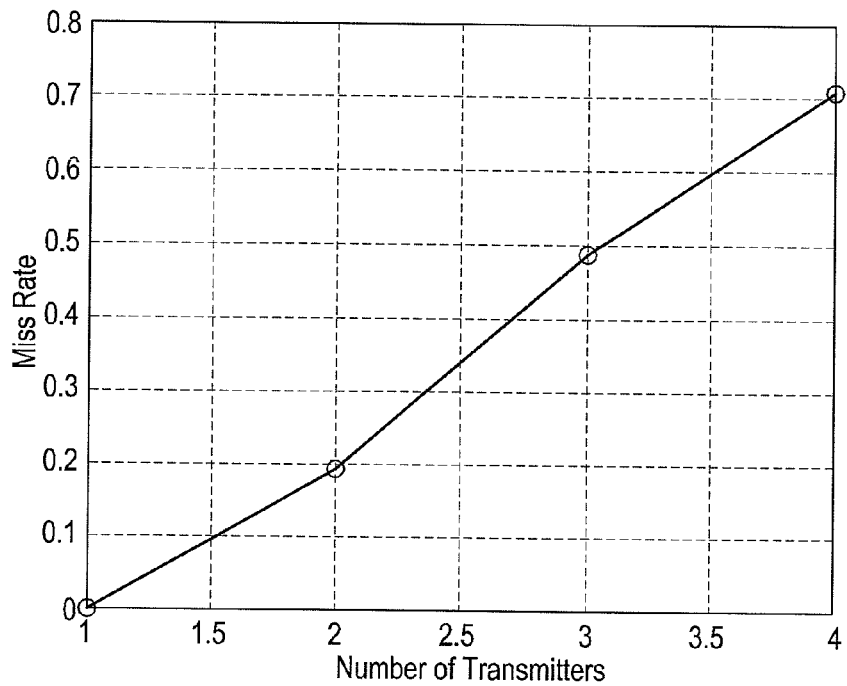
FIG. 33 depicts a graph of capability according to the number of terminals when a single Resource Block (RB) is used according to the first embodiment of the present disclosure.

FIG. 33 is a graph showing capability according to the number of terminals when a single Resource Block (RB) is used according to the first embodiment of the present disclosure.

First, a capability in a case where one to four terminals overlappingly transmit signals to one RB is shown.

Figure 34:
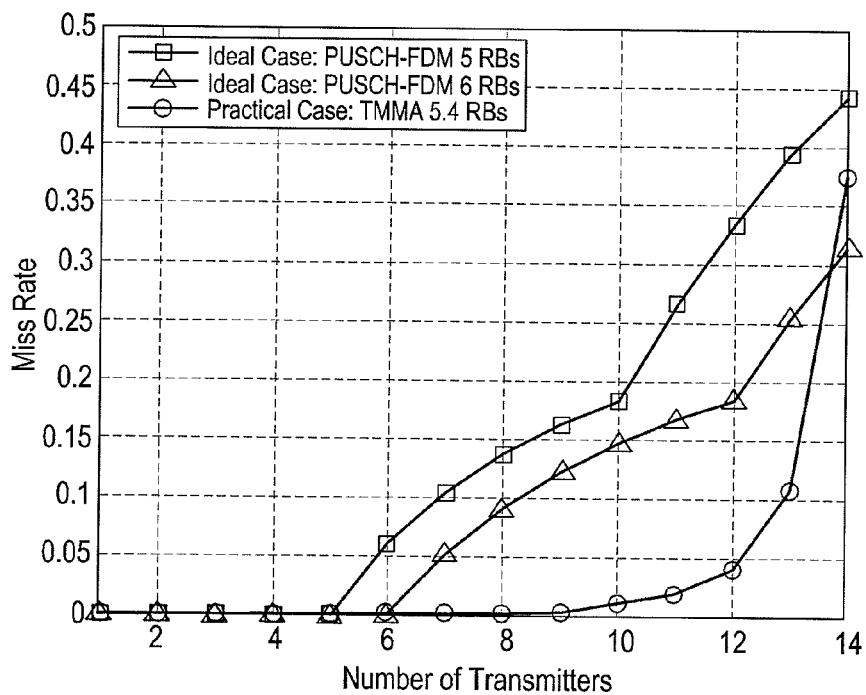
FIG. 34 depicts a graph of a difference between the present disclosure and the related art.

Based on the result, the capability between the present disclosure and the related art can be compared as illustrated in FIG. 34.

FIG. 34 is a graph showing a difference between the present disclosure and the related art.

FIG. 34 illustrates a result generated by comparing the capability when each terminal selects RBs to make the least congestion (related art) and the capability provided by the present disclosure in cases where there are five and six RBs.

Referring to FIG. 34, it is noted that the present disclosure has significantly excellent multiple-access capability in comparison with the related art. Through the application of the present disclosure, it is noted that the miss rate is remarkably low in comparison with the related art until the number of terminals is thirteen.

When the embodiments are implemented by software, firmware, middleware, or a microcode, a program code, or code segments, they can be stored in a machine-readable medium, such as a storage component. The code segment may indicate a procedure, a function, a sub program, a program, a routine, a sub routine, a module, a software package, a class, or a random combination of commands, data structures, or program description sentences. The code segment may be coupled with another code segment or a hardware circuit by transmitting and/or receiving information, data, factors, parameters, or memory contents. The information, factors, parameters, and data may be transmitted using an arbitrary proper means including memory sharing, message transmission, token transmission, and network transmission.

In order to realize the software, the technologies described herein may be implemented as modules (for example, processes, functions and the like) performing the functions described herein. Software codes may be stored in memory units and executed by processors. The memory units may be implemented inside or outside the processor. In this case, the memory units can be access the processor to be communicable through various means known in the art.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting a multiple-access signal by a transmitter in a mobile communication system, the method comprising:
   selecting a transmission resource based on a trellis map, wherein the trellis map indicates information associated with a position changing of at least one tone;
   determining the multiple-access signal, wherein the multiple-access signal is mapped to one resource slot; and
   transmitting the multiple-access signal as a function of the selected transmission resource to a receiver,
   wherein the multiple-access signal transmission is overlapped at two or more transmitters in a time axis.

2. The method of claim 1, wherein the transmission resource include a resource slot and the multiple-access signal associated with one or more transmitters that are mapped to the one resource slot.

3. The method of claim 1, wherein the trellis map includes position information of an initial tone.

4. The method of claim 3, wherein the position information of the initial tone is determined a predetermined bit information.

5. The method of claim 3, wherein the trellis map includes at least one of a predetermined trellis map, a trellis map stored in a memory, or a trellis map provided to the transmitter.

6. An apparatus for transmitting a multiple-access signal by a transmitter in a mobile communication system, the apparatus comprising:
   a controller configured to:
   select a transmission resource based on a trellis map, wherein the trellis map indicates
   information associated with a position changing of at least one tone; and
   determine the multiple-access signal, wherein the multiple-access signal is mapped to one resource slot;
   a transmitter configured to transmit the multiple-access signal in accordance with the selected transmission resource to a receiver,
   wherein the multiple-access signal transmission is overlapped at two or more transmitters in a time axis.

7. The apparatus of claim 6, wherein the transmission resource includes a resource slot and the multiple-access signal associated with one or more transmitters that are mapped to the one resource slot.

8. The apparatus of claim 6, wherein the trellis map includes position information of an initial tone.

9. The apparatus of claim 8, wherein the position information of the initial tone is determined by a predetermined bit information.

10. The apparatus of claim 8, wherein the trellis map includes at least one of a predetermined trellis map, a trellis map stored in a memory, or a trellis map given to the transmitter.

11. A method of receiving a multiple-access signal in a mobile communication system, the method comprising:
    receiving the multiple-access signal transmitted from a transmitter, wherein the multiple-access signal is overlapped at two or more transmitters in a time axis;
    demodulating the multiple-access signal transmitted from the transmitter;
    reconstructing the multiple-access signal based on a trellis map, wherein the trellis map indicates information associated with a position changing of at least one tone; and
    selecting the reconstructed multiple-access signal in accordance with a transmission resource.

12. The method of claim 11, wherein the transmission resource includes a resource slot and the multiple-access signal associated with one or more transmitters that are mapped to the one resource slot.

13. The method of claim 11, wherein the trellis map includes position information of an initial tone.

14. The method of claim 13, wherein the position information of the initial tone is determined by predetermined bit information.

15. The method of claim 13, wherein the trellis map includes at least one of a predetermined trellis map, a trellis map stored in using a memory, or a trellis map provided to the transmitter.

16. The method of claim 11, wherein the reconstructing the multiple-access signal based on a trellis map comprises:
    detecting a state transition pattern associated with the multiple-access signal transmitted from the transmitter in accordance with a message passing scheme in a unit of a symbol; and
    obtaining the multiple-access signal in accordance with the state transition pattern.

17. The method of claim 16, further comprises:
    connecting one or more paths of the state transition pattern in accordance with the message passing scheme in the unit of the symbol;
    converting the one or more paths to bitstreams; and
    determining information in accordance with a cyclic redundancy check (CRC) inspection on each of the bitstreams.

18. The method of claim 11, further comprises:
    expanding a state space of the trellis map in accordance with separating overlapped symbols.

19. The method of claim 16, further comprises: expanding a state space of the trellis map beforehand in accordance with a backward pre-decoding scheme.

20. An apparatus for receiving a multiple-access signal in a mobile communication system, the apparatus comprising:
    a receiver configured to receive the multiple-access signal transmitted from a transmitter, wherein the multiple-access signal is overlapped at two or more transmitters in a time axis;
    a demodulator configured to demodulate the multiple-access signal transmitted from the transmitter: and
    a controller configured to:
    reconstruct the multiple-access signal based on a trellis map, wherein the trellis map indicates information associated with a position changing of at least one tone; and select the reconstructed multiple-access signal in accordance with a transmission resource.

21. The apparatus of claim 20, wherein the transmission resource includes a resource slot and the multiple-access signal associated with one or more transmitters that are mapped to the one resource slot.

22. The apparatus of claim 20, wherein the trellis map includes position information of an initial tone.

23. The apparatus of claim 22, wherein the position information of the initial tone is determined by predetermined bit information.

24. The apparatus of claim 20, wherein the trellis map includes at least one of a predetermined trellis map, a trellis map stored in using a memory, or a trellis map given to the transmitter.

25. The apparatus of claim 20, wherein the controller is further configured to detect a state transition pattern associated with the multiple-access signal transmitted from the transmitter in accordance with a message passing scheme in a unit of a symbol, and obtain the multiple-access signal in accordance with the state transition pattern.

26. The apparatus of claim 20, wherein the controller is further configured to connect one or more paths of the state transition pattern in accordance with the message passing scheme in the unit of the symbol convert the one or more paths to bitstreams, and determine information in accordance with a cyclic redundancy check (CRC) inspection on each of the bitstreams.

27. The apparatus of claim 20, wherein the controller is configured to expand a state space of the trellis map in accordance with separating overlapped symbols.

28. The apparatus of claim 20, wherein the controller is further configured to expand a state space of the trellis map beforehand in accordance with a backward pre-decoding scheme.

29. The method of claim 1, wherein the at least one tone is an orthogonal frequency division multiplexing (OFDM) tone.

30. The apparatus of claim 6, wherein the at least one tone is an orthogonal frequency division multiplexing (OFDM) tone.

31. The method of claim 11, wherein the at least one tone is an orthogonal frequency division multiplexing (OFDM) tone.

32. The apparatus of claim 20, wherein the at least one tone is an orthogonal frequency division multiplexing (OFDM) tone.

33. The method of claim 1, wherein the two or more transmitters support the same multiple-access environment.

34. The apparatus of claim 6, wherein the two or more transmitters support the same multiple-access environment.

35. The method of claim 11, wherein the two or more transmitters support the same multiple-access environment.

36. The apparatus of claim 20, wherein the two or more transmitters support the same multiple-access environment.

* * * * *